(12) United States Patent
Kim et al.

(10) Patent No.: US 10,127,637 B2
(45) Date of Patent: Nov. 13, 2018

(54) AUTOMATIC ORIENTATION ADJUSTMENT OF SPHERICAL PANORAMA DIGITAL IMAGES

(71) Applicant: Adobe Systems Incorporated, San Jose, CA (US)

(72) Inventors: Byungmoon Kim, Sunnyvale, CA (US); Joon-Young Lee, San Jose, CA (US); Jinwoong Jung, Pohang (KR); Gavin Miller, Los Altos, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 198 days.

(21) Appl. No.: 15/251,500

(22) Filed: Aug. 30, 2016

(65) Prior Publication Data
US 2018/0061011 A1    Mar. 1, 2018

(51) Int. Cl.
*H04N 5/232* (2006.01)
*G06T 5/00* (2006.01)
*G06T 7/00* (2017.01)

(52) U.S. Cl.
CPC ............ *G06T 5/002* (2013.01); *G06T 7/0024* (2013.01); *H04N 5/23238* (2013.01)

(58) Field of Classification Search
CPC .... H04N 5/23238; G06T 5/002; G06T 7/0024
See application file for complete search history.

(56) References Cited

U.S. PATENT DOCUMENTS

| 7,620,909 | B2 * | 11/2009 | Park | H04N 5/232 345/592 |
| 8,200,039 | B2 * | 6/2012 | Jin | G06T 7/30 382/276 |
| 8,665,273 | B2 * | 3/2014 | Kajikawa | G06T 15/20 345/427 |
| 9,153,014 | B2 * | 10/2015 | Yu | G06T 5/006 |
| 9,307,165 | B2 * | 4/2016 | Levy | G06K 9/20 |
| 9,582,731 | B1 * | 2/2017 | Butko | G06K 9/00664 |

OTHER PUBLICATIONS

Akinlar, C., Topal, C., "Edlines: Real-Time Line Segment Detection by Edge Drawing (ed)," published in: 18th IEEE International Conference on Image Processing (ICIP), Sep. 11, 2011, pp. 2837-2840.

(Continued)

*Primary Examiner* — Tsion B Owens
(74) *Attorney, Agent, or Firm* — Keller Jolley Preece

(57) ABSTRACT

The present disclosure includes methods and systems for correcting distortions in spherical panorama digital images. In particular, one or more embodiments of the disclosed systems and methods correct for tilt and/or roll in a digital camera utilized to capture a spherical panorama digital images by determining a corrected orientation and generating an enhanced spherical panorama digital image based on the corrected orientation. In particular, in one or more embodiments, the disclosed systems and methods identify line segments in a spherical panorama digital image, map the line segments to a three-dimensional space, generate great circles based on the identified line segments, and determine a corrected orientation based on the generated great circles.

20 Claims, 18 Drawing Sheets

(56) References Cited

OTHER PUBLICATIONS

Bazin, J.C., Demonceaux C., Vasseur, P., and Kweon, I., "Rotation estimation and vanishing point extraction by omnidirectional vision in urban environment," The International Journal of Robotics Research, Jan. 2012 vol. 31 No. 1, pp. 63-81.

Bosse, M., Rikoski, R., Leonard, J., Teller, S., "Vanishing Points and 3D Lines From Omnidirectional Video," Massachusetts Institute of Technology, Cambridge MA 02 139, USA, Published in: 2002 International Conference on Image Processing. 2002. Proceedings. Date of Conference: Sep. 22-25, 2002, pp. 513-516.

Gallagher, A.C., "Using Vanishing Points to Correct Camera Rotation in Images," Eastman Kodak Company, Published in: The 2nd Canadian Conference on Computer and Robot Vision, 2005. Proceedings. Date of Conference: May 9-11, 2005.

He, K., Chang, H., Sun, J., "Content-Aware Rotation," Published in: 2013 IEEE International Conference on Computer Vision (ICCV), Date of Conference: Dec. 1-8, 2013, pp. 553-560.

Kamali, M., Banno, A., Bazin, J.C., So Kweon, I., Ikeuchi, K., "Stabilizing Omnidirectional Videos Using 3D Structure and Spherical Image Warping," MVA2011 IAPR Conference on Machine Vision Applications, Jun. 13-15, 2011, Nara, Japan, pp. 177-180.

Kopf, J., Lischinski, D., Deussen, O., Cohen-Or, D., Cohen, M., "Locally Adapted Projections to Reduce Panorama Distortions," Eurographics Symposium on Rendering 2009, vol. 28 (Jun. 2009), No. 4, Computer Graphics Forum, pp. 1083-1089.

Lee, H., Shechtman, E., Wang, J., Lee, S., "Automatic Upright Adjustment of Photographs With Robust Camera Calibration," Published in: IEEE Transactions on Pattern Analysis and Machine Intelligence (vol. 36, Issue: 5, May 2014), pp. 833-844.

Scaramuzza, D.E., "Omnidirectional Vision: From Calibration to Robot Motion Estimation," A dissertation submitted to ETH ZURICH for the degree of Doctor of Science, DISS. ETH No. 17635, Universitádi Perugia, Italy, Feb. 2008.

Schindler, G., Dellaert, F., (2004). "Atlanta World: An Expectation Maximization Framework for Simultaneous Low-Level Edge Grouping and Camera Calibration in Complex Man-Made Environments." Proceedings of the IEEE Conference on Computer Vision and Pattern Recognition (CVPR 2004), Jun. 27-Jul. 2, 2004, pp. 203-209.

von Gioi, R.G., Jakubowicz, J., Morel, J.M., Randall, G., "LSD: A Fast Line Segment Detector with a False Detection Control," Published in: IEEE Transactions on Pattern Analysis and Machine Intelligence (vol. 32, Issue: 4, Apr. 2010) pp. 722-732.

Wang, X., Cao, X., Guo, X., Song, Z., "Beautifying Fisheye Images using Orientation and Shape Cues," Proceedings of the 22nd ACM international conference on Multimedia, Publication Date: Nov. 3, 2014, pp. 829-832, Publisher: ACM New York, NY, USA © 2014.

Wang, Z., Jin, X. Xue, F., He, X., Li, R., Zha, H., "Panorama to cube: a content-aware representation method," Published in: Proceeding SA '15 SIGGRAPH Asia 2015 Technical Briefs Article No. 6, Publication date: Nov. 2, 2015, Publisher: ACM New York, NY, USA © 2015.

\* cited by examiner

AUTOMATIC ORIENTATION ADJUSTMENT OF SPHERICAL PANORAMA DIGITAL IMAGES

BACKGROUND

Recent years have seen rapid development in the area of digital camera devices, particularly digital camera devices capable of capturing 360-degree panorama digital images. Indeed, consumers now have access to a variety of low-cost, portable digital cameras that can capture spherical panorama digital images for entertainment, personal, or business purposes. For example, some digital cameras now utilize two wide-angle lenses pointed in opposite directions to capture a 360-degree panorama digital image of a user's surroundings. As a result of the proliferation of such digital cameras, digital spherical panorama images are becoming more popular and widely available.

Although existing digital cameras allow users to capture spherical panorama digital images, users still encounter problems in attempting to capture clear, high-quality panorama digital images. For example, in capturing a spherical panorama digital image, users often tilt and/or roll the digital camera. Digital cameras that are not aligned vertically when capturing spherical panorama digital images cause distortions of the captured scene relative to the axes of the panorama digital image. For example, digital panorama images frequently include slanted objects and/or wavy horizons as a result of tilt and roll when capturing the digital image.

Some conventional digital image processing systems seek to remedy such distortions by actively measuring camera attitude when capturing panorama digital images. For example, some conventional digital image processing systems utilize a gyroscope to measure the attitude of a digital camera as it captures a panorama digital image. Based on the measured camera attitude, some conventional digital processing systems correct for skew in the resulting panorama digital image.

Although such conventional image processing systems can align scenes to axes of a panorama digital image, they also have a number of shortcomings. For example, many cameras lack means for tracking camera attitude with sufficient precision to correct distortions in a spherical panorama digital image. Similarly, even for images originally captured with such attitude data, it is not uncommon for attitude data to become separated from the spherical panorama digital image. Where existing data regarding camera orientation is not available, conventional digital image processing systems are unable to correct for distortions in orientation in a spherical panorama digital image.

These and other problems exist with regard to correcting skewed spherical panorama digital images.

BRIEF SUMMARY

One or more embodiments of the present disclosure provide benefits and/or solve one or more of the foregoing or other problems in the art with systems and methods that automatically correct skew in spherical panorama digital images. In particular, the disclosed systems and methods automatically adjust the upright direction of a spherical panorama digital image to correct orientation errors, which may have resulted, for example, from tilt and/or roll of a digital camera in capturing a spherical panorama digital image. More specifically, in one or more embodiments, the disclosed systems and methods analyze line segments portrayed in a spherical panorama digital image to identify a corrected orientation in a three-dimensional space. For instance, the disclosed systems and methods generate three-dimensional projections (e.g., great circles with the largest radius possible on a unit sphere) corresponding to detected line segments, and then utilize the three-dimensional projections to identify a corrected vertical pole. The disclosed systems and methods then modify pixels of the panorama digital image based on the corrected vertical pole to generate a corrected panorama digital image (i.e., a panorama digital image oriented to align to image axes).

For example, in one or more embodiments, the disclosed systems and methods detect a plurality of vertical line segments portrayed in a spherical panorama digital image having a plurality of pixels captured by a digital camera. In particular, in one or more embodiments, the disclosed systems and methods map vertical line segments of the plurality of vertical line segments to corresponding vertical great circles of a sphere centered on a position of the digital camera. Further, the disclosed systems and methods determine a corrected orientation of the spherical panorama digital image based on the vertical great circles. Finally, the disclosed systems and methods generate an enhanced spherical panorama digital image by modifying the plurality of pixels of the spherical panorama digital image based on the corrected orientation.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

The detailed description is described with reference to the accompanying drawings in which.

DETAILED DESCRIPTION

Figure 1:
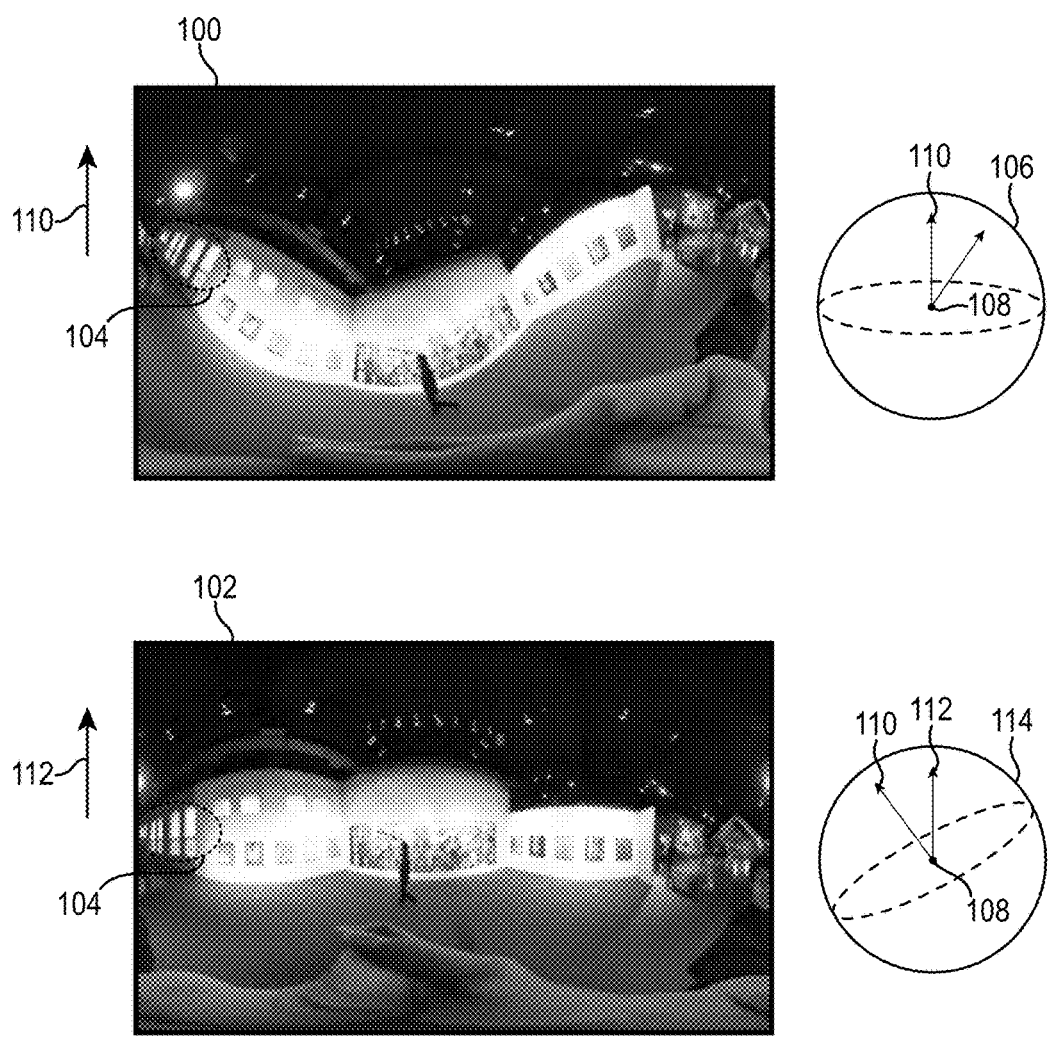
FIG. 1 illustrates a spherical panorama digital image and an enhanced spherical panorama digital image in accordance with one or more embodiments.

One or more embodiments of the present disclosure include a digital automatic orientation adjustment system that corrects distortions in spherical panorama digital images. In particular, the digital automatic orientation adjustment system corrects distortions in spherical panorama digital images caused by tilt and/or roll of a digital camera utilized to capture the spherical panorama digital images. For example, the disclosed digital automatic orientation adjustment system identifies a corrected orientation based on line segments in a spherical image. The digital automatic orientation adjustment system then corrects any distorted (e.g., skewed, warped, or tilted) representations in the spherical panorama digital image. For instance, the digital automatic orientation adjustment system modifies pixels in a spherical panorama digital image such that a horizon portrayed in the spherical panorama digital image aligns with image axes. Similarly, in one or more embodiments, the digital automatic orientation adjustment system modifies pixels in the spherical panorama digital image to correct distorted individuals, objects, and/or features portrayed in the spherical panorama digital image.

As mentioned above, in one or more embodiments the digital automatic orientation adjustment system corrects orientation in spherical panorama digital images by first detecting line segments. Specifically, in one or more embodiments, the digital automatic orientation adjustment system detects vertical and/or horizontal line segments in a spherical panorama digital image. For example, the digital automatic orientation adjustment system applies a line segment detection algorithm and applies a horizontal and/or vertical angle threshold to identify horizontal and/or vertical line segments in a spherical panorama digital image. To illustrate, the digital automatic orientation system can identify line segments based on variations in color and/or grey levels in a digital image, by computing level-line angels at each pixel to produce a level-line field, which is then segmented into line support regions that are analyzed as candidates for a line segment via a validation procedure.

Further, the digital automatic orientation system can apply horizontal and/or vertical angle thresholds to distinguish vertical line segments from horizontal line segments.

Upon identifying line segments, in one or more embodiments, the digital automatic orientation adjustment system projects the identified line segments into a three-dimensional space. In particular, in one or more embodiments, the digital automatic orientation adjustment system projects detected line segments onto a unit sphere (e.g., a unit sphere centered on the position of the digital camera utilized to capture the spherical panorama digital image). Projecting the line segments onto a unit sphere aids in identifying any skew in the spherical panorama digital image (e.g., a difference between a vertical direction portrayed in a spherical panorama digital image and a corrected vertical pole).

Indeed, in one or more embodiments, the digital automatic orientation adjustment system utilizes horizontal line segments in a spherical panorama digital image as guides to point toward a vanishing point on a horizon in three-dimensional space, while utilizing vertical line segments as guides to point toward a common vanishing point (e.g., a corrected vertical pole) in three-dimensional space. The digital automatic orientation adjustment system maps vertical and/or horizontal line segments in spherical panorama digital images to spheres, then determines a corrected orientation based on the alignment of the horizontal and vertical great line segments.

For example, in one or more embodiments, the digital automatic orientation adjustment system projects vertical line segments onto a unit sphere and then generates vertical great circles (e.g., circles with the largest radius possible on the unit sphere that divide the unit sphere into two equal hemispheres) based on the vertical line segments. Because vertical line segments generally point toward a vanishing point in three-dimensional space, the digital automatic orientation adjustment system utilizes the vertical great circles to determine a corrected orientation (e.g., the corrected vertical pole). Specifically, in one or more embodiments, the digital automatic orientation adjustment system utilizes the vertical great circles to identify vectors (e.g., unit vectors) defining alignment of the vertical great circles and then determines a corrected vertical pole based on the identified vectors.

Similarly, in one or more embodiments, the digital automatic orientation adjustment system utilizes horizontal line segments to identify a corrected orientation of a spherical panorama digital image. For example, in one or more embodiments, the digital automatic orientation adjustment system projects horizontal line segments onto a unit sphere centered on the digital camera. The digital automatic orientation adjustment system then generates horizontal great circles on the sphere corresponding to each of the horizontal line segments. Because parallel horizontal line segments generally point toward at least one vanishing point on a horizon in three-dimensional space (e.g., an equator of a unit sphere), the digital automatic orientation adjustment system can utilize the horizontal great circles to determine a corrected orientation. Specifically, in one or more embodiments, the digital automatic orientation adjustment system utilizes intersections of horizontal great circles to identify vanishing points and vectors pointing toward the equator of a sphere (i.e., unit vectors perpendicular to a corrected vertical pole). The digital automatic orientation adjustment system can then utilize these vectors to identify a corrected orientation of the spherical panorama digital image.

In one or more embodiments, the digital automatic orientation adjustment system utilizes both vertical and horizontal line segments to identify a corrected orientation corresponding to a spherical panorama digital image. In particular, in one or more embodiments, the digital automatic orientation adjustment system utilizes a cost function based on vectors generated from vertical great circles and horizontal great circles to identify a vertical pole. Specifically, in one or more embodiments, the digital automatic orientation adjustment system generates a cost function that assigns a cost based on vertical line segments in a spherical panorama digital image, a cost based on horizontal line segments in the spherical image, and a cost based on an original orientation of the spherical image. As explained in greater detail below, the digital automatic orientation adjustment system minimizes the cost function to identify a corrected vertical pole of the spherical image.

As mentioned previously, upon identifying a corrected orientation (e.g., a corrected vertical pole), the digital automatic orientation adjustment system can also modify pixels of the spherical panorama digital image to generate an enhanced spherical panorama digital image. In particular, the digital automatic orientation adjustment system modifies individual pixels based on the original orientation of the spherical panorama digital image and the corrected orientation. Specifically, the digital automatic orientation adjustment system maps a pixel to a position on a sphere centered on the digital camera, rotates the sphere from the original orientation to the corrected orientation to generate a modified position of the pixel, and then maps the modified position of the pixel back to the spherical panorama digital image. In this manner, the digital automatic orientation adjustment system generates enhanced digital images that orient scenes portrayed in a spherical panorama digital image to align with axes in the spherical panorama digital image.

Moreover, as mentioned above, in one or more embodiments, upon generating an enhanced spherical panorama digital image, the digital automatic orientation adjustment system provides the enhanced spherical panorama digital image for display. For example, the digital automatic orientation adjustment system can provide enhanced spherical panorama digital images for display on a computing device that allows users to rotate and view the spherical panorama digital images in response to user input. For example, the digital automatic orientation adjustment system can provide the enhanced spherical panorama digital image for display via a virtual reality device that provides a virtual environment reflecting the scene portrayed in the spherical panorama digital image, wherein the scene changes based on user input via the virtual reality device (e.g., rotating or tilting a user's head rotates or tilts the user's view of the scene).

By generating enhanced spherical panorama digital images, the digital automatic orientation adjustment system improves the function of digital devices in comparison to conventional systems. For example, conventional digital systems have difficulty generating spherical panorama digital images suitable for utilization in virtual reality devices. Indeed, distorted spherical panorama digital images displayed via a virtual reality device can cause a user to feel disoriented (e.g., because the horizon is not parallel to a horizontal axis in the virtual environment, a user may feel that they are falling to one side). The digital automatic orientation adjustment system can provide enhanced spherical panorama digital images for display via virtual reality devices (or other devices) that provide a more realistic environment representing a scene portrayed in the spherical panorama digital image (e.g., a scene where the horizon is parallel to a horizontal axis in the virtual environment).

In addition, the digital automatic orientation adjustment system can also improve digital devices by generating enhanced spherical panorama digital images without having to capture attitude data regarding the position or orientation of the digital camera at the time of capture. Indeed, the digital automatic orientation adjustment system corrects spherical panorama digital images without installing and utilizing gyroscopes or other attitude measuring devices within a digital camera. Thus, the digital automatic orientation adjustment system requires less data than conventional systems to correct skewed digital images.

Further, in one or more embodiments, the digital automatic orientation adjustment system improves function of a computing device by correcting spherical panorama digital images while requiring minimal computing processing time and power. Indeed, as discussed in greater detail below, the digital automatic orientation adjustment system provides an elegant solution to a complex problem that imposes minimal processing power to complete. For example, researchers have determined that the digital automatic orientation adjustment system can identify optimal rotation of 5376× 2688 spherical panorama digital images in less than a second (a few hundred milliseconds). Moreover, the digital automatic orientation adjustment system can resample pixels and generate a corrected 360-digital image in approximately two seconds.

Additional detail will now be provided regarding the digital automatic orientation adjustment system in relation to illustrative figures portraying exemplary embodiments. FIG. 1 portrays an original spherical image 100 and an enhanced spherical panorama digital image 102. More specifically, the enhanced spherical panorama digital image 102 illustrates the original spherical panorama digital image 100 upon application of one or more embodiments of the digital automatic orientation adjustment system.

As used herein, the term "spherical panorama digital image" refers to a digital image that includes an enlarged field of view. For example, the term "spherical panorama digital image" includes a panorama digital image that portrays 360 degrees of a field of view (e.g., 360 degrees of a scene in the real world). More particularly, the term "spherical panorama digital image" includes a panorama digital image that portrays 360 degrees of horizontal field of view and at least 180 degrees of vertical field of view. For instance, a spherical panorama digital image includes a panorama digital image captured by a digital camera that portrays a representation of objects in front of, behind, and to the sides of the digital camera. Alternatively, a spherical panorama digital image is a set of images stitched together.

Accordingly, in relation to FIG. 1, the original spherical panorama digital image 100 is a digital image that portrays 360 degrees of a horizontal field of view. Moreover, the enhanced spherical panorama digital image 102 portrays 360 degrees of a horizontal field of view upon correction of skew in the original spherical panorama digital image 100.

As used herein, the term "digital camera" refers to a device capable of capturing a digital image. In particular, the term "digital camera" includes a device capable of capturing a spherical panorama digital image. For example, a digital camera includes a device with a plurality of lenses that can capture 360 degrees of a field of view in a single digital image. To illustrate, in relation to FIG. 1, the original spherical panorama digital image 100 comprises a digital image captured by a digital camera with two wide angle lenses that captures a 360-degree view of the interior of a building.

As shown in FIG. 1, however, the digital camera utilized to capture the original spherical panorama digital image 100 was not vertically aligned, and, therefore, generates a digital image with a number of distortions. For example, the original spherical panorama digital image 100 portrays a plurality of windows 104. As shown, the plurality of windows 104 are skewed, such that the windows 104 appear to be slanted from horizontal. In particular, it appears that the windows 104 project into a horizon that is not aligned to axes of the original spherical panorama digital image 100.

Similar to the plurality of windows 104, the remaining structures and objects in the original spherical panorama digital image are bended, distorted, and skewed. Indeed, it appears that the floor and structures portrayed in the original spherical panorama digital image 100 are warped (e.g., rise and fall across the field of view of the original spherical panorama digital image 100). Such distortions are common in spherical panorama digital images as a result of tilt and/or roll in the digital camera that skew the original orientation of the original spherical panorama digital image 100.

As used herein, the term "original orientation" refers to a direction that defines alignment of a spherical panorama digital image. In particular, the term "original orientation" can include a direction in three-dimensional space that defines a perspective portrayed in an original spherical panorama digital image. For example, the term "original orientation" comprises a vector defining a direction relative to a digital camera utilized to capture a spherical panorama digital image. Thus, for instance, an original orientation comprises a vertical alignment of a digital camera utilized to capture a spherical panorama digital image. Specifically, in one or more embodiments, the original orientation comprises a unit vector of (0, 1, 0) in relation to a unit sphere representing an original spherical panorama digital image oriented based on the alignment of the digital camera at the time the spherical panorama digital image was captured.

For example, in relation to FIG. 1, the original spherical panorama digital image 100 comprises an original orientation 110. The original orientation 110 reflects a vertical direction in three-dimensional space that defines orientation of the original spherical panorama digital image 100. In particular, the original orientation 110 reflects a vertical direction from the digital camera that captured the spherical panorama digital image.

To illustrate, a spherical panorama digital image can be represented as pixels located on a unit sphere centered on the digital camera. The original orientation describes the alignment of the unit sphere. Thus, as shown in FIG. 1, the original spherical panorama digital image 100 is represented as a sphere 106 (e.g., a unit sphere) surrounding a digital camera at a position 108. The original orientation 110 is a vertical vector (e.g., a unit vector with coordinates (0, 1, 0)) from the position 108 in three-dimensional space.

Because of tilt and/or roll in the digital camera at the time of capture, however, the original orientation 110 is not aligned to a true vertical direction. Indeed, the original orientation 110 is skewed from true vertical, causing the distortions reflected in the original spherical panorama digital image 100. In one or more embodiments, the digital automatic orientation adjustment system corrects distortions in spherical panorama digital images by identifying a corrected orientation. In particular, in relation to FIG. 1, the digital automatic orientation adjustment system removes distortions by identifying a corrected orientation 112 corresponding to the scene portrayed in the original spherical panorama digital image 100.

As used herein, the term "corrected orientation" refers to a direction reflecting a modified alignment in relation to an original orientation. In particular, the term "corrected orientation" includes a corrected alignment corresponding to an original orientation that indicates the alignment of a digital camera that captured a spherical panorama digital image. For instance, the term "corrected orientation" includes a vector that defines the amount of tilt-and/or roll of a digital camera utilized to capture a spherical panorama digital image. Thus, in relation to an original orientation defined by a vertical direction relative to a digital camera, the term "corrected orientation" refers to a corrected vertical pole (i.e., a vertical direction in three-dimensional space without tilt or roll of the digital camera). To illustrate, if a digital camera captures a spherical panorama digital image with two degrees of tilt; the original orientation can be defined as a unit vector in the vertical direction and the corrected orientation can be defined as a unit vector with two degrees of tilt.

For example, in relation to FIG. 1, the digital automatic orientation adjustment system identifies the corrected orientation 112. The corrected orientation 112 reflects a corrected vertical pole of the scene captured in the original digital spherical panorama digital image 100. In other words, in relation to the sphere 106, the corrected orientation 112 reflects the true north pole of the sphere 106 without tilt and/or roll of the digital camera at the position 108.

As described in greater detail below, the digital automatic orientation adjustment system can correct the original spherical panorama digital image 100 by modifying orientation of the sphere 106 based on the corrected orientation 112 to generate a modified sphere 114. In particular, as shown, the digital automatic orientation adjustment system identifies the corrected orientation 112 and generates a modified sphere 114 such that the corrected orientation 112 is aligned vertically. Moreover, the digital automatic orientation adjustment system resamples pixels of the original spherical panorama digital image 100 utilizing the corrected orientation 112 to correct distortions or skew.

Indeed, as shown in FIG. 1, utilizing this process, the digital automatic orientation adjustment system generates the enhanced spherical panorama digital image 102. As shown, the digital automatic orientation adjustment system corrects pixels portraying the plurality of windows 104 in the original spherical panorama digital image 100 such that the plurality of windows 104 in the enhanced spherical panorama digital image 102 appear to be aligned to axes of the enhanced 360-degree digital image 102. Moreover, structures and other objects in the enhanced spherical panorama digital image 102 are aligned, without irregular distortions or bends.

Figure 2:
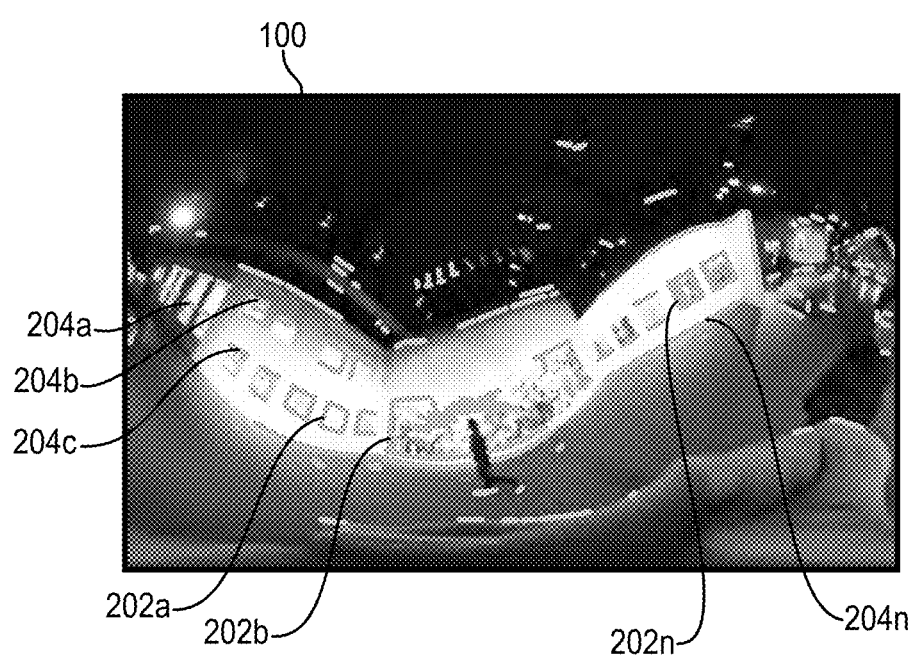
FIG. 2 illustrates a representation of line segments detected in a spherical panorama digital image in accordance with one or more embodiments.

To identify the corrected orientation 112 and generate the enhanced spherical panorama digital image 102, in one or more embodiments, the digital automatic orientation adjustment system utilizes line segments in the original spherical panorama digital image 100. Indeed, as mentioned above, in one or more embodiments, the digital automatic orientation adjustment system corrects distortions by first identifying line segments portrayed in a spherical panorama digital image. For example, FIG. 2 illustrates the original spherical panorama digital image 100 with a plurality of line segments 202a-204n. Specifically, FIG. 2 illustrates the original spherical panorama digital image 100 with a plurality of vertical line segments 202a-202n and a plurality of horizontal line segments 204a-204n.

As used herein, the term "line segment" refers to a locally straight contour in a digital image. In particular, the term "line segment" includes an edge portrayed in a digital image. Similarly, the term "line segment" includes a line portrayed in a digital image bounded by two end points. The term "line segment" can include a "vertical line segment" and a "horizontal line segment." A vertical line segment refers to a line segment with a gradient in a vertical direction. For example, a vertical line segment includes a line segment portrayed in a digital image that points toward a vertical pole. Moreover, a horizontal line segment refers to a line segment with a gradient in a horizontal direction. For example, a horizontal line segment includes a line segment that points toward a horizon. In addition, a horizontal line segment includes a line segment portrayed in a digital image that points toward a vanishing point on the horizon.

In one or more embodiments, the digital automatic orientation adjustment system identifies line segments in a spherical panorama digital image utilizing a line segment detection algorithm. For example, in relation to FIG. 2, the digital automatic orientation adjustment system detects the line segments 202a-204n utilizing a Line Segment Detector algorithm, as described, for example, in von Gioi, R., Jakubowicz, J., Morel, J.-M, & Randall, G., LSD: A fast line segment detector with a false detection control, IEEE PAMI 32, 722-732 (2010), which is incorporated herein by reference in its entirety.

The digital automatic orientation adjustment system can utilize a variety of line segment detection algorithms to identify line segments in a spherical panorama digital image. For example, the digital automatic orientation adjustment system can also utilize an EDLines algorithm, as described in relation to Akinlar, C. & Topal, C., Edlines: A real-time line segment detector with a false detection control, Pattern Recognition Letters 32, 1633-1642 (2011), which is also incorporated herein by reference in its entirety. Indeed, the digital automatic orientation system can utilize a variety of different types of line segment detection schemes (in isolation or in combination) to identify line segments in a spherical panorama digital image.

Furthermore, upon identifying a line segment, the digital automatic orientation adjustment system can also determine a variety of line segment characteristics. For instance, by analyzing the orientation of pixels in a line segment (e.g., rise and run of pixels reflecting a line segment) the digital automatic orientation adjustment system identifies a line segment gradient (i.e., a slope, direction, or angle of a line segment). Similarly, by analyzing pixels of an identified line segment, the digital automatic orientation adjustment system can identify a length (e.g., by comparing a beginning and end of a line segment), starting point, mid-point, end point, or other point of a line segment.

Moreover, as discussed above, the digital automatic orientation adjustment system can also identify vertical line segments and/or horizontal line segments. In particular, in one or more embodiments, the digital automatic orientation adjustment system filters vertical line segments and horizontal line segments from other line segments by applying one or more thresholds. For example, in identifying vertical line segments, the digital automatic orientation adjustment system applies a vertical angle threshold. Specifically, the digital automatic orientation adjustment system applies a vertical angle threshold, such that detected line segments with gradients (i.e., slopes) that satisfy the vertical angle threshold are classified as vertical line segments and detected line segments with gradients (i.e., slopes) that do not satisfy the vertical angle threshold are not classified as vertical line segments.

Similarly, the digital automatic orientation adjustment system can apply a horizontal angle threshold to identify horizontal line segments. Specifically, the digital automatic orientation adjustment system can apply a horizontal angle threshold, such that detected line segments with gradients (i.e., slopes) that satisfy the horizontal angle threshold are classified as horizontal line segments and detected line segments with gradients (i.e., slopes) that do not satisfy the horizontal angle threshold are not classified as horizontal line segments.

For instance, in one or more embodiments, the digital automatic orientation adjustment system defines the gradient of a line segment as the angle from the x-direction of the spherical panorama digital image. If the gradient of a detected line segment is less than the horizontal angle threshold, $\gamma_h$, the digital automatic orientation adjustment system classifies the detected line segment as horizontal. If the gradient of a detected line segment is greater than a vertical angle threshold, $\gamma_v$, the digital automatic orientation adjustment system classifies the line segment as vertical. Moreover, in one or more embodiments, if the gradient is greater than $\gamma_h$ but less than $\gamma_v$ the line segment is classified as neither vertical nor horizontal and discarded from further analysis.

Thus, in relation to FIG. 2, the digital automatic orientation adjustment system identifies the line segments 202a-204n utilizing a line segment detection algorithm. Moreover, the digital automatic orientation adjustment system identifies the vertical line segments 202a-202n by applying a vertical angle threshold (e.g., $\gamma_v=\pi/3$). Specifically, the digital automatic orientation adjustment system determines that the absolute value of the gradient corresponding to each of the line segments 202a-202n exceeds the vertical angle threshold.

Similarly, in relation to FIG. 2, the digital automatic orientation adjustment system identifies the horizontal line segments 204a-204n by applying a horizontal angle threshold (e.g., $\gamma_h=\pi/6$). In particular, the digital automatic orientation adjustment system determines that the absolute value of the gradient corresponding to each of the horizontal line segments 204a-204n falls below the horizontal angle threshold. Moreover, in relation to the embodiment of FIG. 2, the digital automatic orientation adjustment system identifies any line segments between the vertical angle threshold and the horizontal angle threshold and discards those angles with regard to further analysis.

As mentioned previously, upon identifying line segments (i.e., vertical and horizontal line segments) of a spherical panorama digital image, the digital automatic orientation adjustment system can utilize the line segments to generate great circles. As used herein, the term "great circle" refers to a circle on the outer surface of a sphere. More specifically, the term "great circle" includes a circle on the outer surface of a unit sphere that divides the unit sphere into two hemispheres (e.g., two equal hemispheres). For instance, the term "great circle" includes a circle on the surface of a sphere with a radius (and/or diameter/circumference) equal to the radius of the sphere. Moreover, a "great circle" includes a circle of the largest size that can be drawn on the surface of a sphere.

Although described generally herein as a "great circle," the digital automatic adjustment system can utilize any three-dimensional projection to identify a corrected orientation. As used herein, the term "three-dimensional projection" refers to a three-dimensional geometric shape. In particular, a "three-dimensional projection" can include a three-dimensional geometric shape projected onto a sphere. For example, the digital automatic adjustment system can utilize a semi-circle (e.g., a semi-circle having the largest possible radius on a unit sphere), an arc on a unit sphere, or another three-dimensional projection in relation to a unit sphere (e.g., a unit sphere centered on a position of a digital camera)

As mentioned previously, a great circle (or three-dimensional projection) includes "vertical great circles" and "horizontal great circles" (i.e., vertical three-dimensional projections and horizontal three-dimensional projections). A vertical great circle is a great circle that points toward a vertical pole. For instance, a vertical great circle includes a great circle that passes through a vertical pole on a sphere. Moreover, a vertical great circle includes a great circle generated based on a vertical line segment. In addition, a horizontal great circle is a great circle that point towards a horizon (e.g., a vanishing point on an equator of a unit sphere). For instance, a horizontal great circle includes a great circle that passes through a vanishing point. Moreover, a horizontal great circle includes a great circle generated based on a horizontal line segment.

Figure 3:
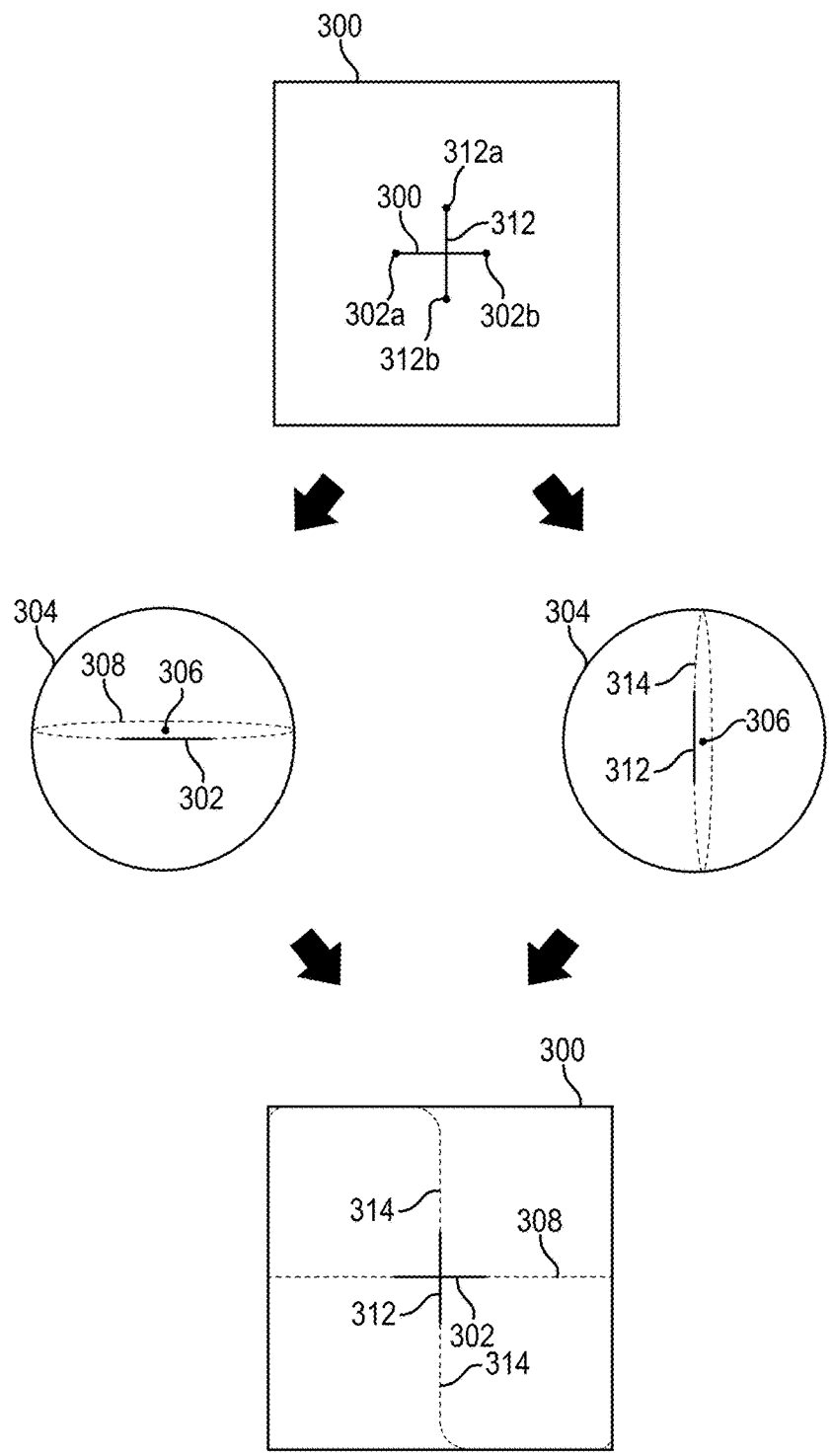
FIG. 3 illustrates a representation of projecting line segments to a sphere and generating great circles in accordance with one or more embodiments.

For example, FIG. 3 illustrates generating a horizontal great circle and a vertical great circle in accordance with one or more embodiments. In particular, FIG. 3 illustrates representations of an original spherical panorama digital image 300. The original spherical panorama digital image 300 comprises a horizontal line segment 302 (comprising a starting point 302a and an end point 302b) together with a vertical line segment 312 (comprising a starting point 312a and an end point 312b). As shown, the digital automatic orientation adjustment system maps both the horizontal line segment 302 (e.g., the starting point 302a and the end point 302b) and the vertical line segment 312 (e.g., the starting point 312a and the end point 312b) to a sphere 304 (e.g., a unit sphere) and generates a horizontal great circle 308 and a vertical great circle 314.

The digital automatic orientation adjustment system maps the line segments 302, 312 to the sphere 304 based on positions of the line segments 302, 312 in the original spherical panorama digital image 300. Indeed, because a spherical panorama digital image reflects a spherical panorama view of a scene, the coordinates of a pixel on a spherical panorama digital image correspond to a latitude and longitude of a sphere centered on the position of the digital camera utilized to capture the spherical panorama digital image. Accordingly, in relation to FIG. 3, the digital automatic orientation adjustment system generates the sphere 304 (i.e., a unit sphere centered on a position 306 of the digital camera that captured the spherical panorama digital image) and maps the line segments 302, 312 to the sphere 304 by converting coordinates of the line segments 302, 312 (e.g., coordinates of the starting point 302a, the end point 302b, the starting point 312a, and the end point 312b) to latitudes and longitudes on the sphere 304.

To illustrate, consider an embodiment where the original spherical panorama digital image 300 is 360 units wide and 360 units tall, and the starting point 302a is located at coordinates (100, 100) on the spherical panorama digital image. In such circumstances, the digital automatic orientation adjustment system can map the starting point 302a to the sphere 304 by projecting the starting point 302a to a latitude of 100 degrees and a longitude of 100 degrees on the sphere 304. In particular, the digital automatic orientation adjustment system can divide the sphere 304 into 360 latitudes and 360 longitudes and map the starting point 302a to a latitude of 100 and a longitude of 100.

Upon mapping line segments to a sphere, the digital automatic orientation adjustment system can also determine a great circle corresponding to the line segment. In particular, the digital automatic orientation adjustment system can project a line segment along the circumference of the sphere to generate a great circle.

For example, FIG. 3 illustrates the horizontal great circle 308 and the vertical great circle 314. The digital automatic orientation adjustment system generates the horizontal great circle 308 by extending the horizontal line segment 302 around the surface of the sphere 304. Similarly, the digital automatic orientation adjustment system generates the vertical great circle 314 by extending the vertical line segment 312 around the surface of the sphere 304.

It will be appreciated that a great circle can also be represented as a line on a two-dimensional object. For example, the digital automatic orientation adjustment system represents a great circle as a line on a spherical panorama digital image in a two-dimensional plane. Specifically, the digital automatic orientation adjustment system can project a great circle from a sphere back onto a spherical panorama digital image in a two-dimensional plane.

It will be appreciated that the digital automatic orientation adjustment system can represent a great circle in a variety of forms. For example, as described in greater detail below (e.g., in relation to FIGS. 7, 8), in one or more embodiments the digital automatic orientation adjustment system represents a great circle as a vector (e.g., a unit vector reflecting the direction of an axis of the great circle). In addition to representing a great circle as a vector, the digital automatic orientation adjustment system can also represent a great circle as an object in a two-dimensional plane. In particular, the digital automatic orientation adjustment system can utilize latitude and longitude of points on a unit sphere to convert a great circle into a curvilinear object on a spherical panorama digital image represented in a two-dimensional plane.

For example, FIG. 3 illustrates the horizontal great circle 308 and the vertical great circle 314 on a two-dimensional representation of the original spherical panorama digital image 300. As shown, the horizontal great circle 308 projects as a horizontal line on the two-dimensional representation of the original spherical panorama digital image 300 (e.g., unwrapping the horizontal great circle 308 into a two-dimensional plane results in a line centered on the middle of the image because the horizontal great circle 308 lies on the equator of the sphere 304). Similarly, the vertical great circle projects as a vertical line on the two-dimensional representation of the original spherical panorama digital image 300, with some stretching at the north and south poles (e.g., unwrapping the vertical great circle 314 into a two-dimensional plane results in a vertical line, except where the great circle stretches upon conversion to a two-dimensional plane).

It will be appreciated that although FIG. 3 illustrates particular shapes of the horizontal great circle 308 and the vertical great circle 314, great circles can appear as a variety of shapes when represented in a two-dimensional plane. Indeed, particularly where a digital image captures a spherical panorama digital image with tilt and/or roll, horizontal great circles and vertical great circles can become distorted when mapped onto a two-dimensional plane.

Figure 4:
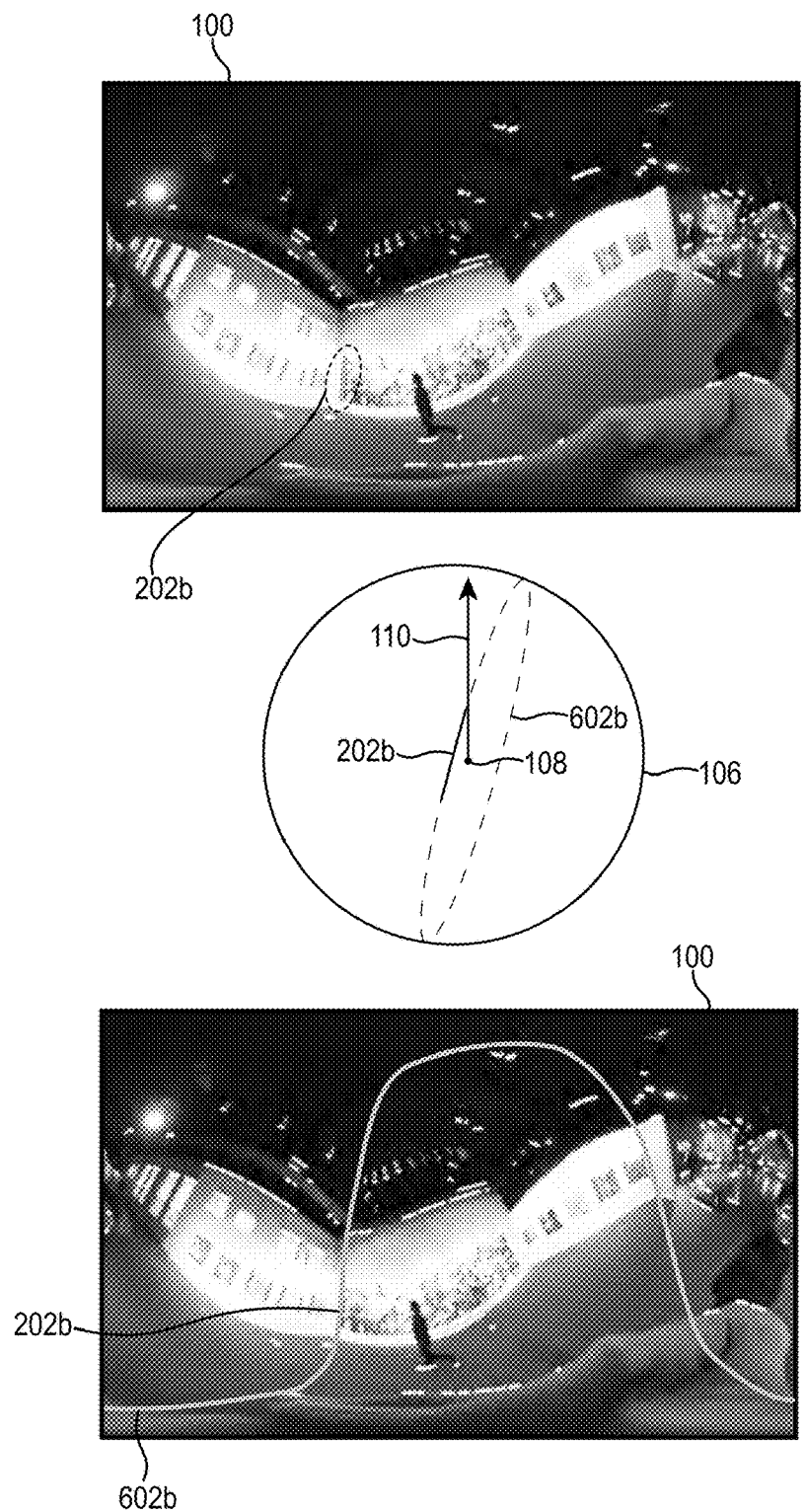
FIG. 4 illustrates identifying a vertical line segment and generating a vertical great circle in accordance with one or more embodiments.
Figure 5:
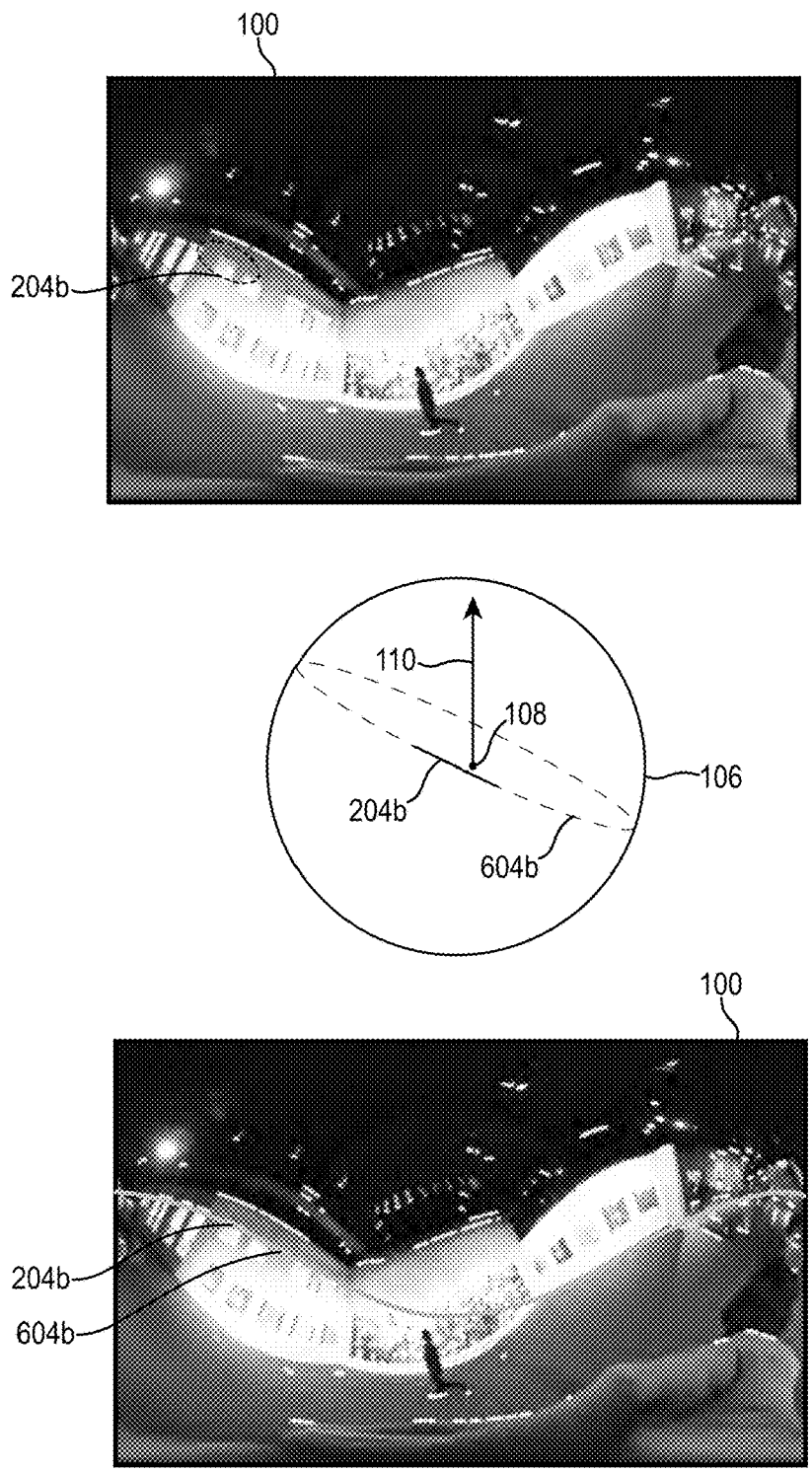
FIG. 5 illustrates identifying a horizontal line segment and generating a horizontal great circle in accordance with one or more embodiments.
Figure 6:
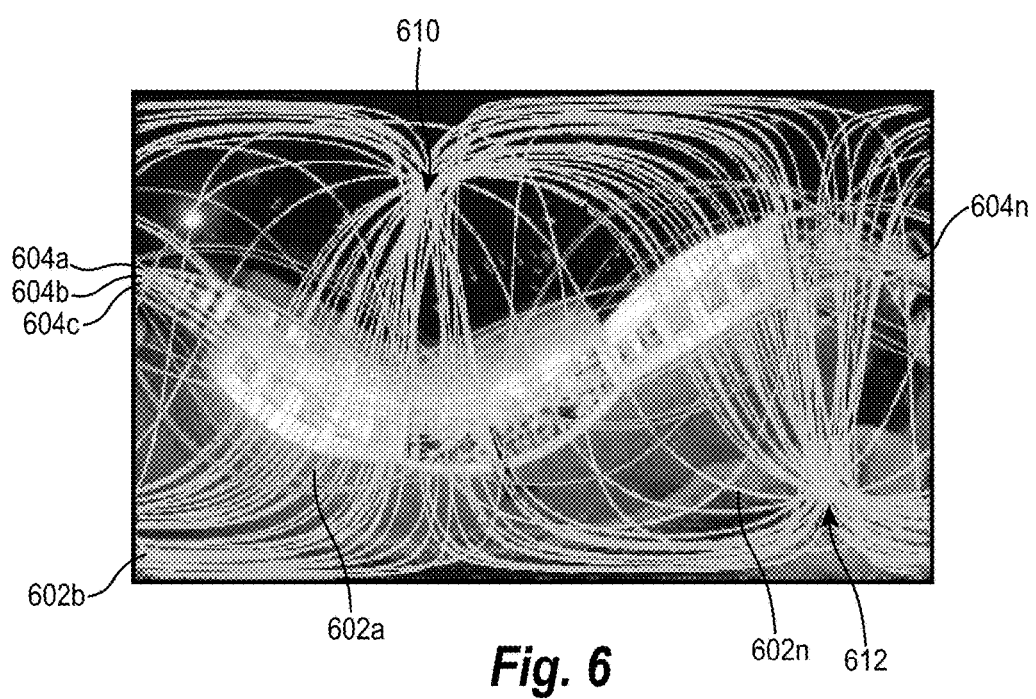
FIG. 6 illustrates generating a plurality of great circles in accordance with one or more embodiments.

For example, FIGS. 4-6 illustrate generating horizontal and vertical great circles in relation to a skewed spherical panorama digital image. In particular, FIG. 4 illustrates generating a vertical great circle, FIG. 5 illustrates generating a horizontal great circle, and FIG. 6 illustrates generating a plurality of great circles corresponding to a plurality of line segments in spherical panorama digital image.

More specifically, FIG. 4 illustrates generating a vertical great circle 602b based on the vertical line segment 202b of the original spherical panorama digital image 100. Indeed, as just described in relation to FIG. 3, the digital automatic orientation adjustment system utilizes the vertical line segment 202b to generate the vertical great circle 602b and project the vertical great circle 602b to a two-dimensional representation of the original spherical panorama digital image 100.

Specifically, as shown in FIG. 4, upon identifying the vertical line segment 202b, the digital automatic orientation adjustment system maps the vertical line segment 202b to the sphere 106 centered on the position 108 (e.g., utilizing the coordinates of the vertical line segment 202b). Furthermore, as shown in FIG. 4, the digital automatic orientation adjustment system utilizes the line segment 202b to generate a great circle on the sphere 106 (e.g., by projecting the line segment 202b around the sphere 106). In addition, as shown in FIG. 4, the digital automatic orientation adjustment system maps the vertical great circle 602b onto the original spherical panorama digital image 100 (i.e., in a two-dimensional plane). As shown, the vertical great circle 602b appears as a curve in the shape of a bell on the original spherical panorama digital image 100 (e.g., unwrapping the vertical great circle 602b into a two-dimensional plane stretches the vertical great circle 602b into the shape of a bell).

Similarly, FIG. 5 illustrates generating a horizontal great circle in relation to a spherical panorama digital image. In particular, as shown, upon identifying the horizontal line segment 204b, the digital automatic orientation adjustment system maps the horizontal line segment 204b to the sphere 106. Further, the digital automatic orientation adjustment system extends the horizontal line segment 204b around the sphere 106 to generate a great horizontal circle 604b. Moreover, the digital automatic orientation adjustment system maps the horizontal great circle 604b to the original spherical panorama digital image 100 (in a two-dimensional plane). As shown, the horizontal great circle 604b appears in the shape of a sinusoidal curve on the original spherical panorama digital image 100.

In this manner, the digital automatic orientation adjustment system can generate vertical great circles corresponding to vertical line segments and horizontal great circles corresponding to horizontal line segments portrayed in a spherical panorama digital image. Indeed, in one or more embodiments, the digital automatic orientation adjustment system generates horizontal great circles and vertical great circles in relation to a plurality of horizontal and vertical line segments. For example, in one or more embodiments, the digital automatic orientation adjustment system generates a horizontal great circle in relation to each horizontal line segment identified (or selected) in a spherical panorama digital image and generates a vertical great circle in relation to each vertical line segment identified (or selected) in a spherical panorama digital image.

To illustrate, FIG. 6 shows a plurality of great circles 602a-604n on the original spherical panorama digital image 100. In particular, FIG. 6 illustrates vertical great circles 602a-602n and horizontal great circles 604a-604n in relation to the original spherical panorama digital image 100. More specifically, the digital automatic orientation adjustment system generates the vertical great circles 602a-602n based on the vertical line segments 202a-202n and generates the horizontal great circles 604a-604n based on the horizontal line segments 204a-204n.

As discussed above, vertical line segments on a spherical panorama digital image tend to point in the direction of vertical vanishing points (e.g., corrected vertical poles reflecting a true north and/or true south pole of a sphere). This is apparent in relation to FIG. 6. Although the vertical great circles 602a-602n originate from different vertical line segments and different locations in the original spherical panorama digital image 100, the vertical great circles 602a-602n intersect in two general locations of the original spherical panorama digital image 100. Specifically, the vertical great circles 602a-602n intersect at the first location 610 and the second location 612.

The two locations 610, 612 correspond to corrected vertical poles of the spherical panorama digital image. In particular, the first location 610 corresponds to the north pole and the second location corresponds to the south pole. If the spherical panorama digital image had been captured without any tilt and/or roll, the locations 610 and 612 would be located at the top and bottom of the original spherical panorama digital image 100 (i.e., the original orientation 110 would align with true north). Because the original spherical panorama digital image 100 was captured by a digital camera with tilt and/or roll, however, the locations 610 and 612 are located at other positions of the spherical panorama digital image.

In addition, as mentioned previously, horizontal line segments on a spherical panorama digital image tend to point toward the horizon. Specifically, parallel horizontal line segments on a spherical panorama digital image tend to point toward a common vanishing point on the horizon. This is also apparent in relation to FIG. 6. Although the horizontal great circles 604a, 604b originate from different horizontal line segments and different locations in the spherical panorama digital image, they intersect at vanishing points on the original spherical panorama digital image 100 (e.g., at a vanishing point on the left edge of the original spherical panorama digital image 300).

As mentioned previously, the digital automatic orientation adjustment system can utilize vertical and/or horizontal great circles to identify a corrected orientation in relation to a spherical panorama digital image. For example, the digital automatic orientation adjustment system identifies a vector corresponding to a vertical and/or horizontal great circle (i.e., a unit vector indicating a direction of a vanishing point on a horizon and/or vertical pole) and utilizes the vector to identify a corrected orientation. Similarly, the digital automatic orientation adjustment system can identify intersection points of vertical and/or horizontal great circles and utilize the intersections to identify a corrected orientation.

Figure 7:
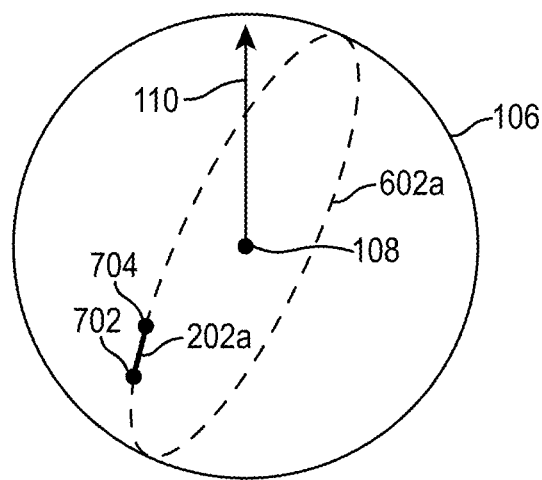
FIG. 7 illustrates generating a vector representative of a great circle in accordance with one or more embodiments.
Figure 7:
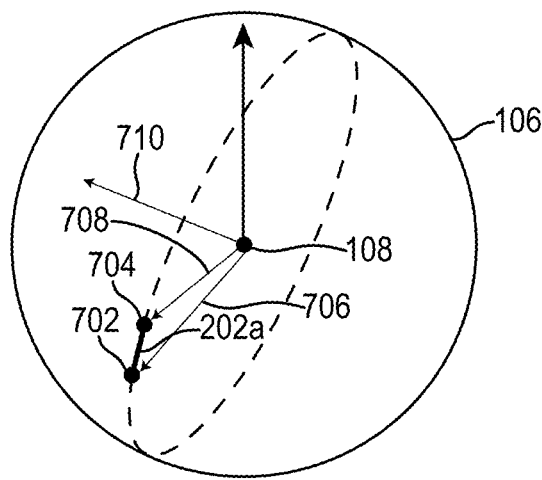

For example, FIG. 7 illustrates generating a vector based on a great circle. In particular, FIG. 7 illustrates the vertical line segment 202a mapped onto the sphere 106 centered on the position 108 with the corresponding vertical great circle 602a. As shown, the vertical line segment 202a comprises a first point 702 and a second point 704. The digital automatic orientation adjustment system utilizes the first point 702 and the second point 704 to determine a vertical great circle vector 710 (e.g., a unit vector) pointing in the direction of the axis of the vertical great circle 602a.

Specifically, the digital automatic orientation adjustment system identifies a first point vector 706 originating from the position 108 to the first point 702. The digital automatic orientation adjustment system also identifies a second point vector 708 originating from the position 108 to the second point 704. The digital automatic orientation adjustment system then determines the vertical great circle vector 710 by identifying a direction perpendicular to both the first point vector 706 and the second point vector 708 (i.e., taking the cross-product of the first point vector 706 and the second point vector 708). Accordingly, the vertical great circle vector 710 reflects a direction of the axis of the vertical great circle 602a.

It will be appreciated that although the embodiment of FIG. 7 generates the vertical great circle vector 710 in the direction of an axis of a vertical great circle (i.e., perpendicular to the corrected vertical pole), the digital automatic orientation adjustment system can determine a vector in a different direction and utilize the vector to determine a corrected orientation. Indeed, rather than determining a vector in the direction of an axis of a great circle, the digital automatic orientation adjustment system can determine a vector in the direction of a vanishing point that a great circle points towards. For instance, in one or more embodiments, the digital automatic orientation adjustment system identifies intersection points of one or more great circles (e.g., intersections of horizontal great circles and/or vertical great circles) to identify vanishing points and determines vectors based on the identified vanishing points.

Figure 8:
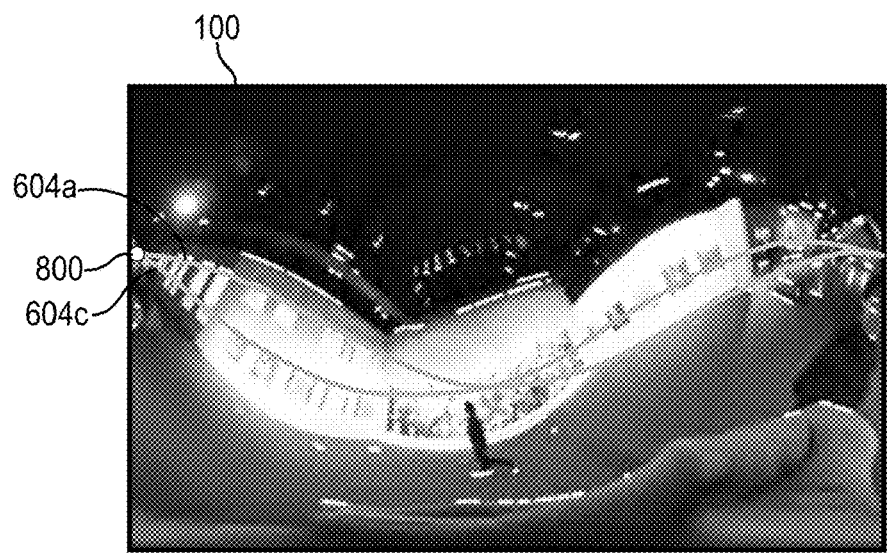
FIG. 8 illustrates generating a vector based on an intersection point of a great circle in accordance with one or more embodiments.
Figure 8:
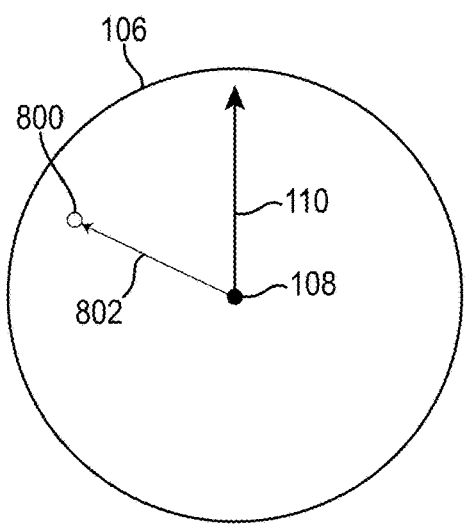

For example, FIG. 8 illustrates determining a vector based on intersection points of great circles in accordance with one or more embodiments. In particular, FIG. 8 illustrates the original spherical panorama digital image 100 with the horizontal great circles 604b, 604c. Moreover, as shown, the digital automatic orientation adjustment system identifies an intersection point 800 of the horizontal great circles 604b, 604c on the original spherical panorama digital image 100.

Further, the digital automatic orientation adjustment system identifies a vector based on the intersection point 800. In particular, the digital automatic orientation adjustment system maps the intersection point 800 to the sphere 106. Moreover, the digital automatic orientation adjustment system then identifies a horizontal vanishing point vector 802 (e.g., a unit vector) from the position 108 to the intersection point 800.

As discussed above, parallel horizontal great circles generally intersect at one or more vanishing points on the horizon. Moreover, absent tilt and/or roll of a digital camera, vanishing points appear on an equator of a sphere centered on a position of a digital camera corresponding to a spherical panorama digital image. Accordingly, the horizontal vanishing point vector 802 approximates a direction of the horizon from the position 108. More particular, the horizontal vanishing point vector 802 approximates a direction that is horizontal absent tilt and/or roll of the digital camera (i.e., a vector that is perpendicular to the vertical pole). Indeed, the digital automatic orientation adjustment system can utilize the horizontal vanishing point vector 802 to identify a corrected orientation (e.g., a corrected vertical pole).

Figure 9:
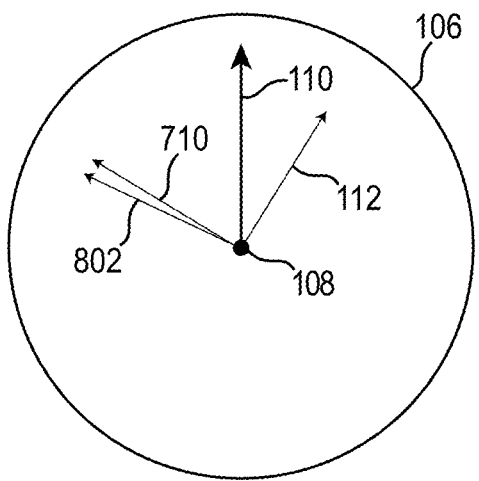
FIG. 9 illustrates determining a corrected vertical pole based on a vector generated from a vertical great circle, a vector generated from a horizontal great circle, and an original orientation in accordance with one or more embodiments.

For instance, as mentioned previously, in one or more embodiments, the digital automatic orientation adjustment system utilizes vertical and/or horizontal great circles to identify a corrected orientation. In particular, the digital automatic orientation adjustment system can utilize vectors generated from the vertical and/or horizontal great circles to identify a corrected orientation. For example, FIG. 9 illustrates identifying a corrected orientation based on vectors generated from vertical great circles and vectors generated from horizontal great circles. Specifically, FIG. 9 illustrates the sphere 106 with the vertical great circle vector 710 and the horizontal vanishing point vector 802. Moreover, FIG. 9 illustrates the corrected orientation 112.

In relation to FIG. 9, the digital automatic orientation adjustment system compares the vertical great circle vector 710, the horizontal vanishing point vector 802, and the original orientation 110 to generate the corrected orientation 112. In particular, the digital automatic orientation adjustment system utilizes a cost function that considers the vertical great circle vector 710, the horizontal vanishing point vector 802, and the original orientation to solve for the corrected orientation 112. More specifically, the digital automatic orientation adjustment system assigns a cost to the extent that the corrected orientation 112 varies from a direction perpendicular to the vertical great circle vector 710; assigns a cost to the extent that the corrected orientation 112 varies from a direction perpendicular to the horizontal vanishing point vector 802; and assigns a cost to the extent that the corrected orientation 112 varies from the original direction 110. The digital automatic orientation adjustment system then solves for the corrected orientation 112 by minimizing the total cost.

The digital automatic orientation adjustment system can utilize a variety of cost functions and optimization approaches to identify a corrected orientation. For example, in one or more embodiments, the digital automatic orientation adjustment system utilizes least-square error to identify a cost and optimize the corrected orientation.

Although FIG. 9 illustrates determining the corrected orientation 112 based on three vectors (e.g., vertical great circle vector 710, the horizontal vanishing point vector 802, and the original orientation 110), it will be appreciated that the digital automatic orientation adjustment system can utilize a cost function that determines the corrected orientation 112 based on a plurality of additional (or fewer) vectors. For instance, in one or more embodiments, the digital automatic orientation adjustment system determines a vector corresponding to each vertical line segment and each horizontal line segment identified (or selected) in spherical panorama digital image. The digital automatic orientation adjustment system can identify a cost corresponding to each vector and solve for the corrected orientation 112 by minimizing the total cost.

To further describe operation of the digital automatic orientation adjustment system, additional disclosure is now provided in relation to a series of equations and/or algorithms utilized to determine a corrected orientation in accordance with one or more embodiments. For example, in one or more embodiments, the digital automatic orientation adjustment system samples two points, $p_1$ and $p_2$ (e.g., the points 702, 704), on a vertical line segment, i (e.g., the vertical line segment 202a), in a spherical panorama digital image. The digital automatic orientation adjustment system then projects the two points $p_1$ and $p_2$ onto a unit sphere (e.g., the sphere 106), centered on c (e.g., the position 108), to obtain points $p_1'$ and $p_2'$. The cross-product of two vectors from c to $p_1'$ and $p_2'$ gives a unit vector $\vec{v}$ (e.g., the vertical great circle vector 710), according to the following equation:

$$\vec{v} = (p_1' - c) \times (p_2' - c)$$

Similarly, the digital automatic orientation adjustment system identifies a vanishing point of a set of parallel horizontal lines (e.g., the horizontal line segments 204b, 204c corresponding to the horizontal great circles 604b, 604c)) as a point (e.g., the intersection point 800) on a sphere (e.g., the sphere 106) represented as a unit vector $\vec{h}$ (e.g., the horizontal vanishing point vector 802). Both the unit vectors $\vec{v}$ and $\vec{h}$ should be perpendicular to the north pole vector, $\vec{P}$ (e.g., the corrected orientation 112), if there is no tilt and roll of the digital camera.

Further, in one or more embodiments, the digital automatic orientation adjustment solves for the north pole vector, $\vec{P}$, utilizing the following cost function:

$$E = \alpha \sum_i (\vec{v}_i \cdot \vec{P})^2 + \beta \sum_j (\vec{h}_j \cdot \vec{P})^2 + \lambda(1 - \vec{y} \cdot \vec{P})^2$$

where $\vec{v}_i$ is a horizontal great circle vector of a vertical line segment, $l_i$; $\vec{h}_j$ is the vanishing point of a horizontal direction $d_j$ (e.g., a horizontal direction defined by the intersection point of two parallel horizontal great circles); $\vec{y}$ is the original orientation (e.g., the original orientation 110); and α, β, and λ are user-specified relative weights.

By finding the unit vector $\vec{P}$ that minimizes the cost, E, the digital automatic orientation adjustment system can obtain a corrected orientation (i.e., a corrected vertical pole that resolves the tilt and roll of the camera utilized to take the original spherical panorama digital image 100).

It will be appreciated that optimization of the foregoing cost function can be complicated in relation to embodiments that place a unit vector constraint on $\vec{P}$. In one or more embodiments, the digital automatic orientation adjustment system optimizes the foregoing cost function by finding a geometric solution that optimizes the cost function on the surface of the unit sphere. That is, each term in the cost function gives a great circle constraint on the target position of $\vec{P}$. The digital automatic orientation adjustment system can compute intersections of the great circles from the terms in the cost function and take the weighted average of the intersection points (e.g., using quaternion arithmetic). However, in one or more embodiments, the digital automatic orientation adjustment system computes the least-square solution of the cost function and then normalizes the solution, to obtain sufficiently accurate optimization results for $\vec{P}$.

As indicated in the cost function above, in one or more embodiments the digital automatic orientation adjustment system applies different weights in minimizing a cost function. For example, the digital automatic orientation adjustment system can weight costs corresponding to vertical great spheres, horizontal great spheres, and/or the original orientation differently. For example, in one or more embodiments, the digital automatic orientation adjustment system weights the original orientation cost more heavily than the vertical great sphere cost, and weights the vertical great sphere cost more heavily than the horizontal sphere cost (e.g., α=1.0, β=0.5, and λ=10.0).

Although the cost function described above illustrates a cost function based on vectors $\vec{v}$, $\vec{h}$, and $\vec{y}$, it will be appreciated that the digital automatic orientation adjustment system can determine a corrected orientation based on $\vec{v}$ and $\vec{h}$ only, based on $\vec{v}$ and $\vec{y}$ only, based on $\vec{h}$ and $\vec{y}$ only, based on $\vec{v}$ only, or based on $\vec{h}$ only.

Similarly, although the cost function described above generates the vector $\vec{h}$ based on a vanishing point of parallel horizontal lines, the digital automatic orientation adjustment system can also utilize a different vector. For example in one or more embodiments, the cost function defines a vector $\vec{h}'$ based on a direction of the axis of a horizontal great circle (e.g., an approach similar to determining the vector $\vec{v}$ described above). A vector $\vec{h}'$ perpendicular to a horizontal great circle would generally point in a direction toward a vertical pole. Accordingly, in one or more embodiments, the digital automatic orientation adjustment system determines a cost based on the variation between the vector $\vec{h}'$ and $\vec{P}$. Moreover, the digital automatic orientation adjustment system can utilize the determined cost in a cost function to identify the corrected orientation, $\vec{P}$.

It will be appreciated that the digital automatic orientation adjustment system can also utilizes other vectors based on great circles to generate the corrected orientation. For example, rather than determine a vector (e.g., $\vec{v}$) perpendicular to a vertical great circle, the digital automatic orientation adjustment system determines a vector based on intersection points of vertical great circles. For instance, as discussed above, the intersection of two vertical great circles will generally correspond to a location of a vanishing point (i.e., a vertical pole). The digital automatic orientation adjustment system can determine a vector from the center of a unit sphere to the vanishing point. The resulting vector will point toward a vertical pole. Accordingly, in one or more embodiments, the digital automatic orientation adjustment system determines a vector based on intersection points of vertical great circles. The digital automatic orientation adjustment system can also assign a cost to variation between the determined vector and the corrected orientation and utilized the cost to determine a corrected orientation.

As mentioned previously, upon determining a corrected orientation, the digital automatic orientation adjustment system can also utilize the corrected orientation to generate an enhanced spherical panorama digital image. In particular, in one or more embodiments, the digital automatic orientation adjustment system transforms pixels in a spherical panorama digital image based on an original orientation and a corrected orientation to generate an enhanced spherical panorama digital image. Specifically, the digital automatic orientation adjustment system can map pixels in a spherical panorama digital image (e.g., an image in two-dimensional space) to positions on a unit sphere, modify the positions on the unit sphere based on the difference between the original orientation and the corrected orientation, and map the modified positions back to a two-dimensional space to generate the enhanced spherical panorama digital image.

Figure 10:
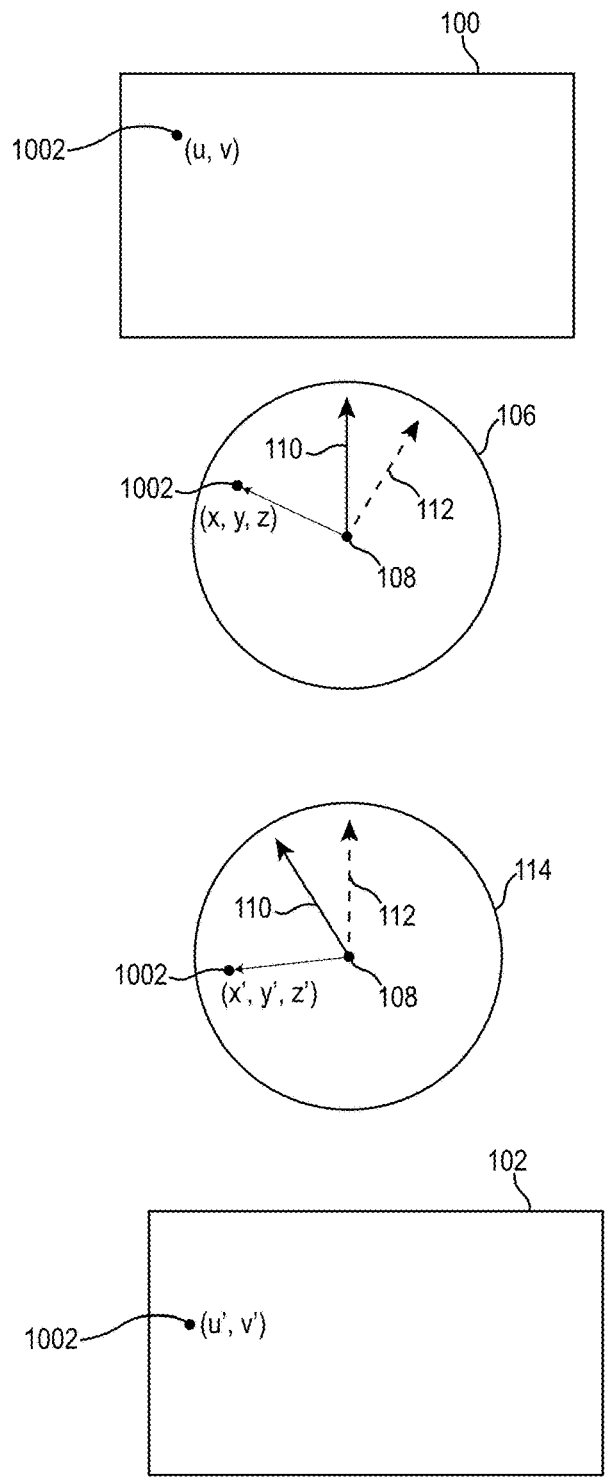
FIG. 10 illustrates modifying a pixel in a spherical panorama digital image based on an original orientation and a corrected vertical pole in accordance with one or more embodiments.

For example, FIG. 10 illustrates generating an enhanced spherical panorama digital image in accordance with one or more embodiments. In particular, FIG. 10 illustrates a representation of the original spherical panorama digital image 100, with a pixel 1002. The digital automatic orientation adjustment system can sample the pixel 1002 from a plurality of pixels making up the original spherical panorama digital image 100. As shown, the pixel 1002 is located at coordinates (u, v) on the original spherical panorama digital image 100.

As shown, in FIG. 10, the digital automatic orientation adjustment system maps the pixel 1002 to the sphere 106 centered on the position 108. Indeed, as described above, the digital automatic orientation adjustment system maps the pixel 1002 to a position on the sphere 106 by converting the position (u, v) to a latitude and longitude on the sphere 106.

In addition, as shown, in one or more embodiments, the digital automatic orientation adjustment system also converts the location of the pixel 1002 to a three-dimensional position (x, y, z) on the sphere 106.

As illustrated in FIG. 10, the position (x, y, z) is in relation to the original orientation 110. In particular, the original orientation 110 is pointed in a vertical direction in relation to the sphere 106. In contrast, the corrected orientation 112 is skewed from vertical in relation to the sphere 106. Accordingly, in one or more embodiments, the digital automatic orientation adjustment system rotates the sphere 106 to generate the modified sphere 114 such that the corrected orientation 112 is pointed vertically. The rotation of the sphere 106 to the modified sphere 114 has the result of moving the pixel 1002 from the coordinates (x, y, z) to modified coordinates (x', y', z'). In other words, the digital automatic orientation adjustment system determines a rotation matrix between the original orientation 110 and the corrected orientation 112 and determines a modified position of the pixel 1002 by applying the rotational matrix.

In addition, as shown in FIG. 10, the digital automatic orientation adjustment system maps the modified position (x', y', z') back to a two-dimensional plane to generate the enhanced spherical panorama digital image 102. In particular, in one or more embodiments, the digital automatic orientation adjustment system converts the modified position (x', y', z') to a latitude and longitude on the modified sphere 114, and then maps the latitude to a position (u', v') on the enhanced spherical panorama digital image 102.

Generating an enhanced digital image can also be described in terms of pseudocode performed by the digital automatic orientation adjustment system. For example, in one or more embodiments, the digital automatic orientation adjustment system defines an algorithm, Cart2Sphe, that converts three-dimensional points from Cartesian coordinates (x, y, z) to spherical coordinates (longitude, latitude). Similarly, the digital automatic orientation adjustment system defines an algorithm Sphe2Cart that converts spherical coordinates (longitude, latitude) to Cartesian coordinates (x, y, z).

In addition, the digital automatic orientation adjustment system determines a rotation matrix, based on a corrected vertical pole, P, as follows (with explanatory descriptors of the steps in brackets):

[Define Original X-Axis] $X_{ori}$=(1,0,0);
[Define New X-Axis] $X_{new}$=$X_{ori}$−dot($X_{ori}$, P)*P;
[Define New Z-Axis] $Z_{new}$=cross($X_{new}$, P);
[Define Inverse Rotation Matrix (i.e., vertical pole to original orientation)] $M_{inv}$=[$X_{new}$', P', $Z_{new}$'], where $X_{new}$', P', and $Z_{new}$' are the negation of $X_{new}$, P, and $Z_{new}$, respectively;
[Define Rotation Matrix (i.e., original orientation to vertical pole)] $M_{rot}$=$M_{inv}$', where $M_{inv}$' is the negation of $M_{inv}$;

Further, the digital automatic orientation adjustment system applies the rotation matrix to each pixel in an original image as follows:

longitude=pixel.xpos, where pixel.xpos is the x-position of a pixel in a spherical panorama digital image;
latitude=pixel.ypos, where pixel.ypos is the y-position of a pixel in a spherical panorama digital image;
(x, y, z)=Cart2Sphe(longitude, latitude);
(x', y', z')=$M_{rot}$*(x, y, z);
($longitude_{new}$, $latitude_{new}$)=Sphe2Cart(x', y', z');
pixel.rgb=original_image($longitude_{new}$, $latitude_{new}$).rgb, where pixel.rgb defines the new location of each pixel within an enhanced digital image.

Although FIG. 10 illustrates a single pixel 1002, it will be appreciated that in one or more embodiments, the digital automatic orientation adjustment system resamples a plurality of pixels (e.g., each pixel of the original spherical panorama digital image 100). In particular, the digital automatic orientation adjustment system can resample each pixel in the original spherical panorama digital image 100, modify the pixel in accordance with one or more techniques described above, and generate the enhanced spherical panorama digital image 102.

In addition, in one or more embodiments, the digital automatic orientation adjustment system utilizes iterative adjustment techniques to further refine spherical panorama digital images. Indeed, in one or more embodiments, the digital automatic orientation adjustment system applies a cost function to identify a corrected vertical pole, modifies pixels in a spherical panorama digital image, applies the cost function again to identify a second corrected vertical pole, modifies pixels in the spherical panorama digital image again, etc. Indeed, by repeatedly correcting orientation of a digital image, the digital automatic orientation adjustment system can produce a spherical panorama digital image with fewer distortions and a more accurate orientation.

Because of distortions in an original 360-degree image, in some circumstances, line segments obtained by a line detection algorithm may not be accurate. Upon application of the systems and methods described above, the digital automatic orientation adjustment system can reduce distortions, especially in the vertical direction, with vertical line segments straightened to align more closely to image axes. Accordingly, to obtain a more accurate orientation adjustment result, in one or more embodiments, the digital automatic orientation adjustment system repeats the optimization process (e.g., application of a cost function to identify a corrected orientation and modification of pixels to generate an enhanced spherical panorama digital image). As iterations progress, the great circles from vertical line segments become more accurate, and the digital automatic orientation adjustment system can determine the corrected vertical pole more accurately as the intersection of the great circles by minimizing the cost function.

Depending on the embodiment, the digital automatic orientation adjustment system iterates this process a number of times. For instance, in one or more embodiments, the digital automatic orientation adjustment system iterates (i.e. repeats) the optimization and resampling process three times.

In addition to applying multiple iterations to increase accuracy of corrected orientation in digital images, in one or more embodiments, the digital automatic orientation adjustment system also selects a subset of vertical and/or horizontal line segments (and corresponding vertical and/or horizontal great circles) to increase accuracy and efficiency. It will be appreciated in light of the disclosure herein that utilizing every vertical and/or horizontal line segment in a digital image can utilize a significant amount of computer processing power and time in determining a corrected orientation. Moreover, some vertical and/or horizontal line segments are more accurate than others in pointing toward a corrected orientation.

Accordingly, in one or more embodiments, the digital automatic orientation adjustment system selects a subset of vertical great circles (i.e., a subset of vertical line segments) and/or a subset of horizontal great circles (i.e., a subset of horizontal line segments). For example, in one or more embodiments, the digital automatic orientation adjustment system selects fifty horizontal great circles and fifty vertical great circles to utilize in identifying a corrected orientation. To illustrate, the digital automatic orientation adjustment system can select a subset of great circles based on the length of the underlying line segment or based on the extent to which the determined line segment or great circles share common characteristics (e.g., point in a common direction or point toward common points in three-dimensional space).

The digital automatic orientation adjustment system can utilize a variety of methods to select a subset of horizontal and/or vertical great circles (i.e., selecting horizontal and/or vertical line segments corresponding to horizontal and/or vertical great circles). For example, in one or more embodiments, the digital automatic orientation adjustment system applies a spherical Hough transform in selecting horizontal and/or vertical line segments corresponding to horizontal and/or vertical great circles. A Hough transform is a feature extraction technique that utilizes a voting procedure to identify instances of common shapes (e.g., line segments or great circles). The voting procedure is carried out in an accumulator space constructed for performing the Hough transform.

As discussed above, for a line segment, two points within the line segment can be represented as two points on a sphere that define a great circle. Moreover, the great circle can be defined by a unit vector (e.g., the vertical great circle vector 710, $\vec{v}$, or $\vec{h}'$). In one or more embodiments, the digital automatic orientation adjustment system defines an accumulator space by quantizing a unit hemisphere (e.g., a hemisphere of the unit sphere) into a resolution of m×n (e.g., m=360 and n=90). Moreover, the digital automatic orientation adjustment system accumulates the unit vectors of the great circles produced by the horizontal and vertical line segments.

In one or more embodiments, the digital automatic orientation adjustment system further weights the line segments. For example, in one or more embodiments, the digital automatic orientation adjustment system weights the line segments based on length. In particular, in accumulating the unit vectors, the digital automatic orientation adjustment system can weight the line segments based on their length.

After accumulating the line segments, the digital automatic orientation adjustment system can utilize the Hough transform to identify $k_1$ horizontal and $k_2$ vertical great circles with the largest weights. In particular, in one or more embodiments, the digital automatic orientation adjustment system utilizes $k_1=50$ and $k_2=50$.

In addition to selecting a subset of horizontal and/or vertical great circles, the digital automatic orientation adjustment system can also select a subset of vanishing points in determining a corrected orientation. In particular, the digital automatic orientation adjustment system can select a subset of intersections of horizontal great circles in determining a corrected orientation. For example, the digital automatic orientation adjustment system selects a subset of vanishing points based on the length of line segments corresponding to the intersection points, based on the number of intersections corresponding to the vanishing point (i.e., the number of vertical great circles that intersect at the vanishing point), and/or the horizontal great circles resulting from application of the Hough transform.

For example, in one or more embodiments, the digital automatic orientation adjustment system utilizes the selected horizontal line segments and corresponding horizontal great circles resulting from the Hough transform to identify a subset of vanishing points. In particular, the digital automatic orientation adjustment system can utilize the $k_1$ horizontal great circles described above in selecting horizontal line segments to identify the vanishing points $\vec{h}_j$.

Specifically, in one or more embodiments, the digital automatic orientation adjustment system quantizes a unit hemisphere in the resolution of m×n. Moreover, the digital automatic orientation adjustment system can rasterize the great circles to find intersections. For instance, the digital automatic orientation adjustment system maps the great circles to cells of the unit hemisphere and determine the cells with the highest values. Furthermore, in one or more embodiments, the digital automatic orientation adjustment system adds the weight of each great circle accumulated in the spherical Hough transform to the quantized cell in the rasterization process.

The digital automatic orientation adjustment system can select a subset of vanishing points based on the quantized cells. For example, in one or more embodiments, the digital automatic orientation adjustment system chooses $k_3$ cells containing the largest weights to determine vanishing points from parallel horizontal lines. To illustrate, in one or more embodiments, the digital automatic orientation adjustment system chooses $k_3=50$ cells corresponding to 50 different intersections and 50 vanishing points.

As described above, the digital automatic orientation adjustment system then utilizes the selected vanishing points and the selected great circles to identify a corrected orientation. For example, the digital automatic orientation adjustment system utilizes the $k_1$ vertical great circles to determine a cost in relation to variation between the vertical great circles and the corrected orientation and can utilize the $k_3$ vanishing points to determine a cost in relation to variation between the vanishing points and the corrected orientation. The digital automatic orientation adjustment system can then optimize a cost function to solve for the corrected orientation.

Figure 11:
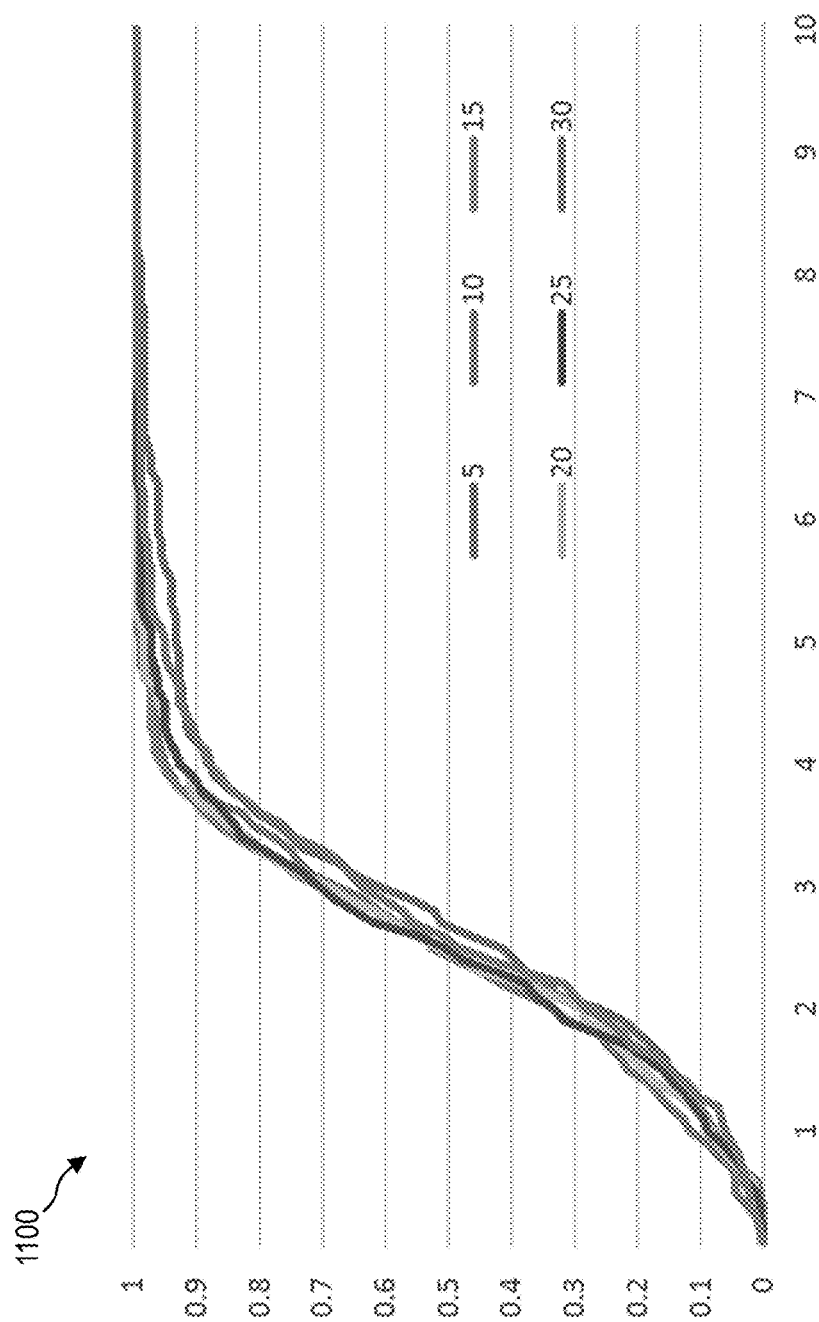
FIG. 11 illustrates a graph illustrating results of research regarding accuracy of corrected orientations generated in accordance with one or more embodiments.

As mentioned above, application of the digital automatic orientation adjustment system can provide accurate results without requiring significant computer processing power or time. In particular, experimenters evaluated the accuracy of one embodiment of the digital automatic orientation adjustment system by applying different rotations to sample spherical panorama digital images and measuring correction of the sample spherical panorama digital images utilizing one embodiment the digital automatic orientation adjustment system. FIG. 11 illustrates results of the experimenters' research.

Specifically, experimenters utilized C++ and OpenCV on a 64-bit Windows PC with an Intel i7-5930K 3.50 GHZ CPU and 128 GB RAM. To compute the corrected orientation (in this embodiment, a corrected vertical pole), experimenters downsampled images in both horizontal and vertical directions. For an input image of size 5376×2688, it took a few hundred milliseconds (less than one second) to obtain the corrected orientation, including the iterative process described above. The final resampling to generate the enhanced spherical panorama digital image took approximately two seconds.

Experimenters utilized 18 ground-truth images, that were taken without tilt and roll of a digital camera. To produce a test set experimenters applied 10 different rotations to the 18 images with a fixed angle but in random directions. Experimenters tested with six values for the fixed angle amount, i.e., 5°, 10°, 15°, 20°, 25°, and 30°. As a result, experimenters obtained 18×10×6=1080 test images. Experimenters utilized α=1.0, β=0.5, and λ=10.0 in relation to the cost function enumerated above, with three iterations to determine corrected orientations and generate enhanced spherical panorama digital images.

FIG. 11 illustrates the test results with regard to the ground truth data set. In particular, FIG. 11 reflects a cumulative histogram 1100 of resulting errors. Specifically, FIG. 11 illustrates a graph where the x-axis reflects the resulting error (in degrees) and the y-axes reflects the percentage of the resulting spherical panorama digital image. Each line on the graph reflects results from a particular data set (i.e., 5°, 10°, 15°, 20°, 25°, and 30°). As illustrated in relation to FIG. 11 for more than 90% of the test images, the digital automatic orientation adjustment system produced upright adjustment results with errors less than 4°.

Figure 12:
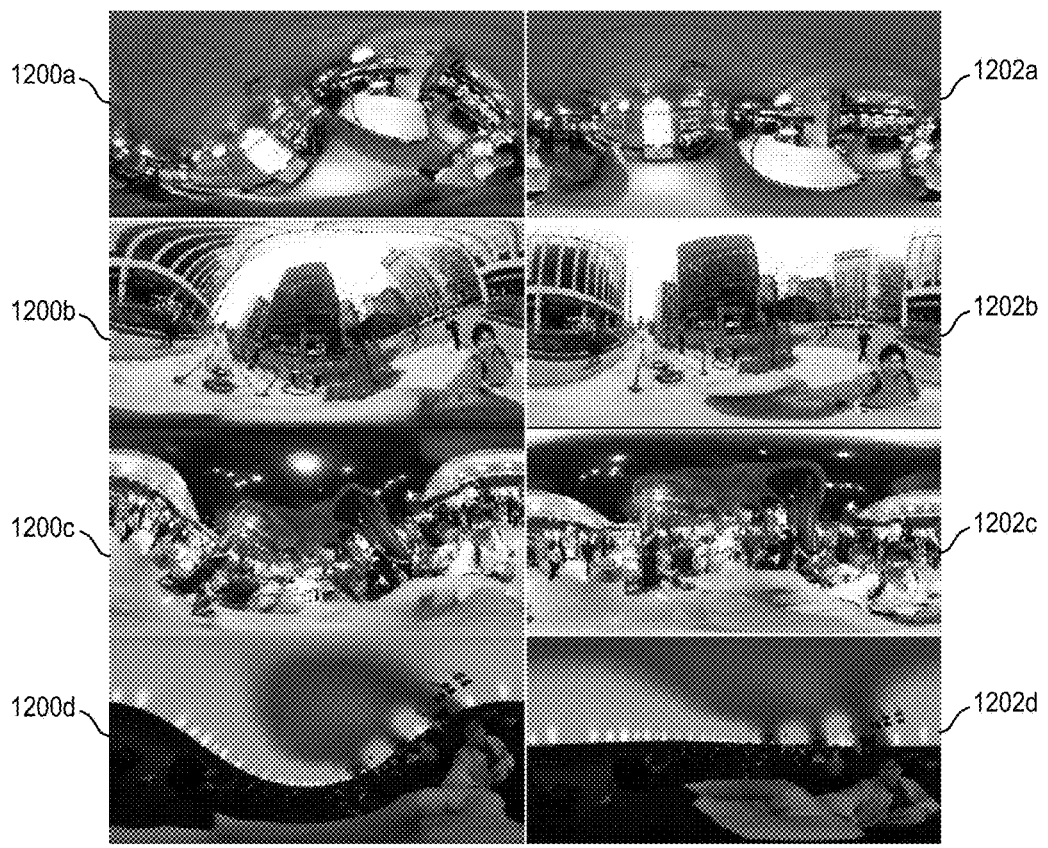
FIG. 12 illustrates a plurality of original spherical panorama digital images and a plurality of enhanced spherical panorama digital images generated in accordance with one or more embodiments.

Accordingly, the digital automatic orientation adjustment system can correct distortions in a wide variety of spherical panorama digital images. For instance, FIG. 12, illustrates various examples of generating enhanced spherical panorama digital images in accordance with one or more embodiments. Specifically, FIG. 12 illustrates original spherical panorama digital images 1200a-1200d. The digital automatic orientation adjustment system modifies the original spherical panorama digital images 1200a-1200d to generate the enhanced spherical panorama digital images 1202a-1202d. As illustrated the digital automatic orientation adjustment system corrects distortions in the original spherical panorama digital images 1200a-1200d.

Figure 13:
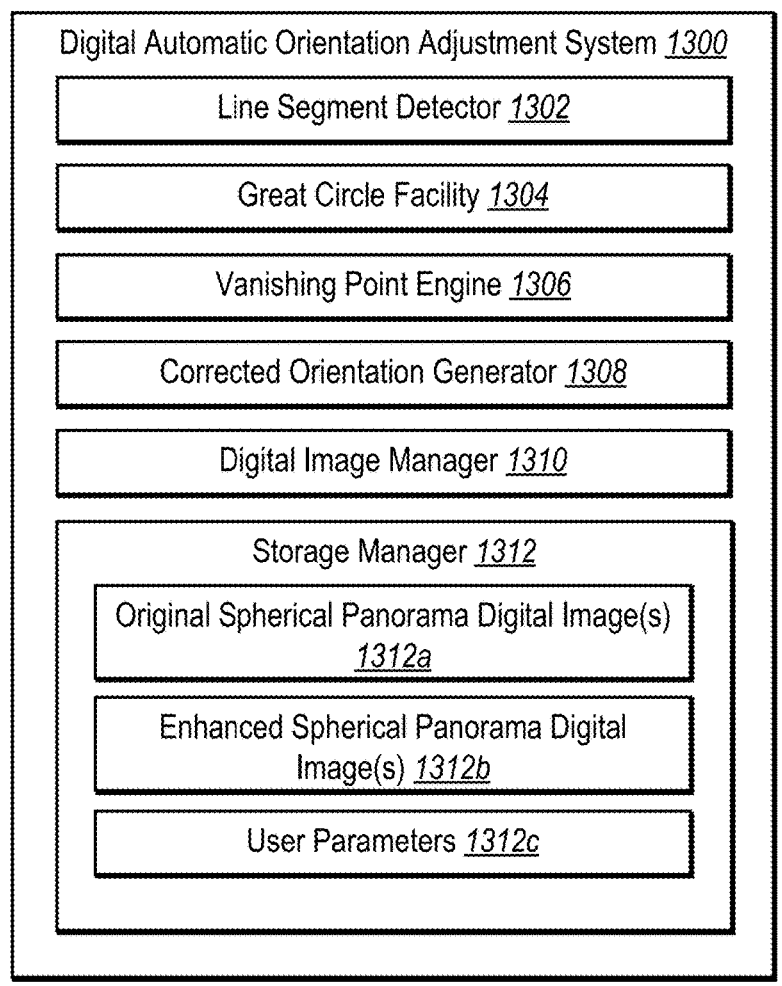
FIG. 13 illustrates a schematic diagram illustrating a digital automatic orientation adjustment system in accordance with one or more embodiments.

Turning now to FIG. 13, additional detail is provided regarding components and capabilities of one embodiment of the digital automatic orientation adjustment system. In particular, FIG. 13 illustrates an embodiment of an exemplary digital automatic orientation adjustment system 1300 (e.g., the digital automatic orientation adjustment system referenced above). As shown, the digital automatic orientation adjustment system 1300 may include, but is not limited to a line segment detector 1302, a great circle facility 1304, a vanishing point engine 1306, a corrected orientation generator 1308, a digital image manager 1310, and a storage manager 1312 (comprising original spherical panorama digital images 1312a, enhanced spherical panorama digital images 1312b, and user parameters 1312c).

As just mentioned, and as illustrated in FIG. 13, the digital automatic orientation adjustment system 1300 may include the line segment detector 1302. The line segment detector 1302 can identify, detect, determine, generate, and/or select line segments. In particular, the line segment detector 1032 can identify vertical and/or horizontal line segments in a spherical panorama digital image. For example, as discussed above, the line segment detector 1302 can utilize a line segment detection algorithm to identify line segments. Moreover, the line segment detector 1302 can apply one or more angle thresholds to determine vertical and/or horizontal line segments in a spherical panorama digital image.

As shown in FIG. 13, the digital automatic orientation adjustment system 1300 also includes the great circle facility 1304. The great circle facility 1304 can generate, create, determine, identify, map, and/or select one or more great circles. In particular, the great circle facility 1304 can project vertical line segments and/or horizontal line segments (i.e., line segments detected via the line segment detector 1302) into vertical great circles and/or horizontal great circles on a unit sphere. More specifically, the great circle facility 1304 can identify a vector corresponding to a great circle (e.g., a vector corresponding to an axis of a great circle) based on points of a line segment projected onto a unit sphere.

The great circle facility 1304 can also select one or more great circles. In particular, the great circle facility 1304 can identify a plurality of great circles (corresponding to a plurality of line segments) and select a subset of great circles from the plurality of great circles. Specifically, as described above, the great circle facility 1304 can apply a Hough transform to a plurality of vertical great circles and/or a plurality of horizontal great circles to select a subset of vertical great circles and/or a subset of horizontal great circles.

As illustrated in FIG. 13, the digital automatic orientation adjustment system 1300 also includes the vanishing point engine 1306. In particular, the vanishing point engine 1306 can identify, determine, and/or select one or more vanishing points. In particular, the vanishing point engine 1306 can identify vanishing points in a spherical panorama digital image. Specifically, in one or more embodiments, the vanishing point engine 1306 identifies vanishing points based on intersections of great circles (e.g., intersections of horizontal great circles).

The vanishing point engine 1306 can also select vanishing points. In particular, the vanishing point engine 1306 can identify a plurality of vanishing points (e.g., a plurality of intersections of horizontal great circles) and select a subset of vanishing points from the plurality of vanishing points. For example, in one or more embodiments, the vanishing point engine 1306 identifies the top fifty vanishing points based on the number of intersections corresponding to the vanishing points or other factors as described above (e.g., utilizing a Hough transform).

In addition to the vanishing point engine 1306, as illustrated in FIG. 13, the digital automatic orientation adjustment system 1300 also includes the corrected orientation generator 1308. The corrected orientation generator 1308 can determine, generate, identify, and/or select a corrected orientation. For example, the corrected orientation generator 1308 can determine a corrected orientation (e.g., a corrected vertical pole) corresponding to a spherical panorama digital image.

More particular, as described above, the corrected orientation generator 1308 can utilize a cost function to determine corrected orientation. Specifically, the corrected orientation generator 1308 can assign a cost to variation between a corrected orientation and vectors reflecting horizontal and/or vertical great circles. Moreover, the corrected orientation generator 1308 can assign a cost to variation from an original orientation. The corrected orientation generator 1308 can utilize a cost function to minimize the assigned costs and determine a corrected orientation.

In addition, as shown in FIG. 13, the digital automatic orientation adjustment system 1300 also includes the digital image manager 1310. The digital image manager 1310 can modify, revise, resample, correct, and/or manage one or more digital images. In particular, the digital image manager 1310 can modify an original spherical panorama digital image to create an enhanced spherical panorama digital image. For example, as described above, the digital image manager 1310 can modify pixels in an original spherical panorama digital image based on a corrected orientation to generate an enhanced spherical panorama digital image.

The digital image manager 1310 can also provide an enhanced spherical panorama digital image for display. In particular, in one or more embodiments, the digital image manager 1310 provides an enhanced spherical panorama digital image for display via a computing device, such that a user of the computing device can rotate the spherical panorama digital image to simulate physical presence in a scene captured in the spherical panorama digital image. For instance, as mentioned above, the digital image manager 1310 can provide an enhanced spherical panorama digital image via a virtual reality device that generates a virtual environment based on the enhanced spherical panorama digital image (e.g., turning a user's head causes the virtual reality device to display different portions of the enhanced spherical panorama digital image, simulating physical presence within the spherical panorama digital image).

Moreover, as illustrated in FIG. 13, the digital automatic orientation adjustment system 1300 also includes the storage manager 1312. The storage manager 1312 maintains data to perform the functions of the digital automatic orientation adjustment system 1300. As illustrated, the storage manager 1312 includes original spherical panorama digital images 1312a, enhanced spherical panorama digital images 1312b, and user parameters 1312c (e.g., $\alpha$, $\beta$, and $\lambda$ described above).

Each of the components 1302-1312 of the digital automatic orientation adjustment system 1300 (as shown in FIG. 13) may be in communication with one another using any suitable communication technologies. It will be recognized that although components 1302-1312 of the digital automatic orientation adjustment system 1300 are shown to be separate in FIG. 13, any of components 1302-1312 may be combined into fewer components, such as into a single facility or module, divided into more components, or configured into different components as may serve a particular embodiment.

The components 1302-1312 of the digital automatic orientation adjustment system 1300 can comprise software, hardware, or both. For example, the components 1302-1312 can comprise one or more instructions stored on a computer-readable storage medium and executable by processors of one or more computing devices. When executed by the one or more processors, the computer-executable instructions of the digital automatic orientation adjustment system 1300 can cause a client device and/or a server device to perform the methods described herein. Alternatively, the components 1302-1312 and their corresponding elements can comprise hardware, such as a special purpose processing device to perform a certain function or group of functions. Additionally, the components 1302-1312 can comprise a combination of computer-executable instructions and hardware.

Furthermore, the components 1302-1312 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1302-1312 may be implemented as a stand-alone application, such as a desktop or mobile application. Furthermore, the components 1302-1312 may be implemented as one or more web-based applications hosted on a remote server. The components 1302-1312 may also be implemented in a suit of mobile device applications or "apps." To illustrate, the components 1302-1312 may be implemented in an application, including but not limited to ADOBE® PHOTOSHOP® software or ADOBE® LIGHTROOM® software. "ADOBE," "PHOTOSHOP," and "LIGHTROOM" are either registered trademarks or trademarks of Adobe Systems Incorporated in the United States and/or other countries.

Figure 14:
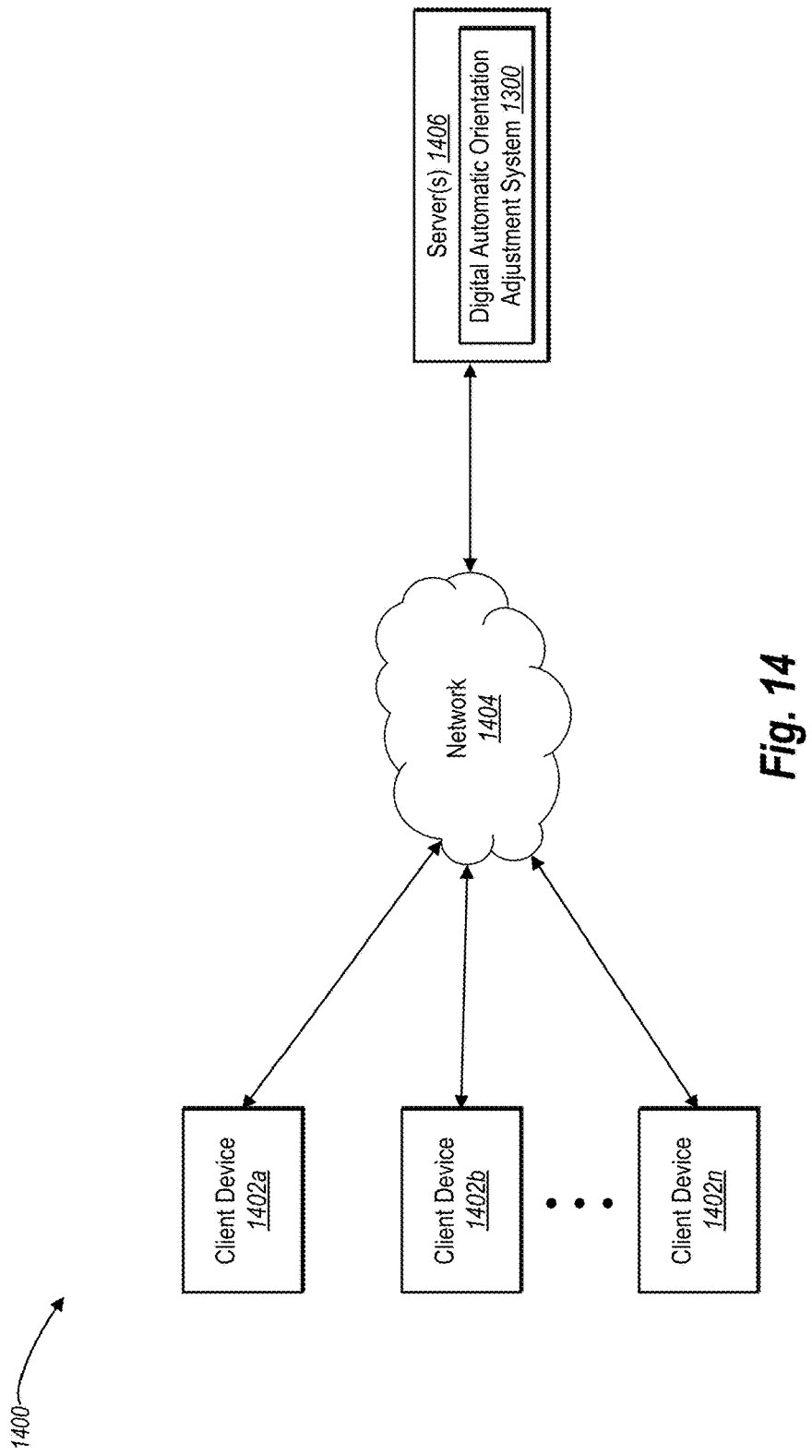
FIG. 14 illustrates a schematic diagram illustrating an exemplary environment in which the digital automatic orientation adjustment system may be implemented in accordance with one or more embodiments.

FIG. 14 illustrates a schematic diagram of one embodiment of an exemplary environment 1400 in which the digital automatic orientation adjustment system 1300 can operate. In one or more embodiments, the exemplary environment 1400 includes one or more client devices 1402a, 1402b, . . . 1402n, a network 1404, and server(s) 1406. The network 1404 may be any suitable network over which the computing devices can communicate. Example networks are discussed in more detail below with regard to FIG. 18.

As illustrated in FIG. 14, the environment 1400 may include client devices 1402a-1402n. The client devices 1402a-1402n may comprise any computing device. For instance, in one or more embodiments, one or more of the client devices 1402a-1402n comprise one or more computing devices described below in relation to FIG. 18.

In addition, the environment 1400 may also include the server(s) 1406. The server(s) 1406 may generate, store, receive, and transmit any type of data, including original spherical panorama digital images 1312a, enhanced spherical panorama digital images 1312b, and/or user parameters 1312c. For example, the server(s) 1406 may transmit data to a client device, such as the client device 1402a. The server(s) 1406 can also transmit electronic messages between one or more users of the environment 1400. In one example embodiment, the server(s) 1406 comprise a content server. The server(s) 1406 can also comprise a communication server or a web-hosting server. Additional details regarding the server(s) 1406 will be discussed below with respect to FIG. 18.

As illustrated, in one or more embodiments, the server(s) 1406 can include all, or a portion of, the digital automatic orientation adjustment system 1300. In particular, the digital automatic orientation adjustment system 1300 can comprise an application running on the server(s) 1406 or a portion of a software application that can be downloaded from the server(s) 1406. For example, the digital automatic orientation adjustment system 1300 can include a web hosting application that allows the client devices 1402a-1402n to interact with content hosted at the server(s) 1406. To illustrate, in one or more embodiments of the exemplary environment 1400, one or more client devices 1402a-1402n can access a webpage supported by the server(s) 1406. In particular, the client device 1402a can run an application to allow a user to access, view, and/or interact with a webpage or website hosted at the server(s) 1406.

Although FIG. 14 illustrates a particular arrangement of the client devices 1402a-1402n, the network 1404, and the server(s) 1406, various additional arrangements are possible. For example, while FIG. 14 illustrates multiple separate client devices 1402a-1402n communicating with the server(s) 1406 via the network 1404, in one or more embodiments a single client device may communicate directly with the server(s) 1406, bypassing the network 1404.

Similarly, although the environment 1400 of FIG. 14 is depicted as having various components, the environment 1400 may have additional or alternative components. For example, the digital automatic orientation adjustment system 1300 can be implemented on a single computing device. In particular, the digital automatic orientation adjustment system 1300 may be implemented in whole by the client device 1402a or the digital automatic orientation adjustment system 1300 may be implemented in whole by the server(s) 1406. Alternatively, the digital automatic orientation adjustment system 1300 may be implemented across multiple devices or components (e.g., utilizing the client devices 1402a-1402n and the server(s) 1406).

By way of example, in one or more embodiments, the client device 1402a can send a request to the server(s) 1406 to access a repository of spherical panorama digital images. The server(s) 1406 can provide access to one or more spherical panorama digital images to the client device 1402a. The client device 1402a can also send a request to the server(s) 1406 to correct the one or more spherical panorama digital images. In response, the server(s) 1406 can identify line segments (e.g., via the line segment detector 1302), generate great circles (e.g., via the great circle facility 1304), identify a corrected orientation (e.g., via the corrected orientation generator 1308), and generate one or more enhanced spherical panorama digital images (e.g., via the digital image manager 1310). Moreover, the server(s) 1406 can provide the one or more enhanced spherical panorama digital images to the client device 1402a.

Figure 15:
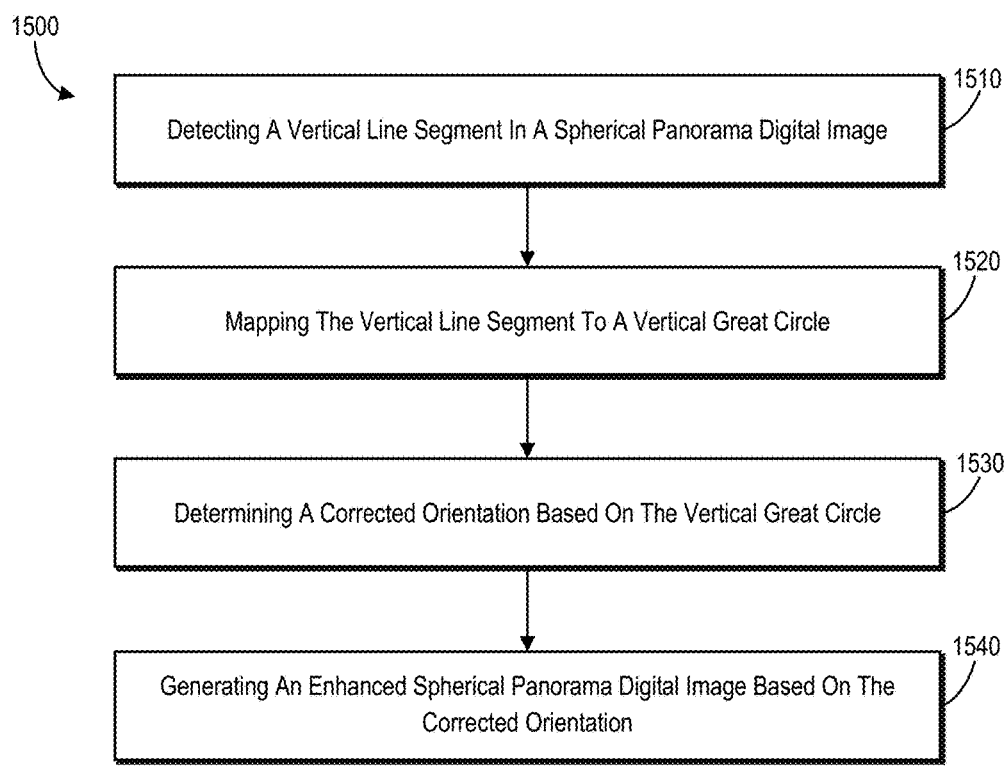
FIG. 15 illustrates a flowchart of a series of acts in a method of correcting skewed spherical panorama digital images in accordance with one or more embodiments.
Figure 16:
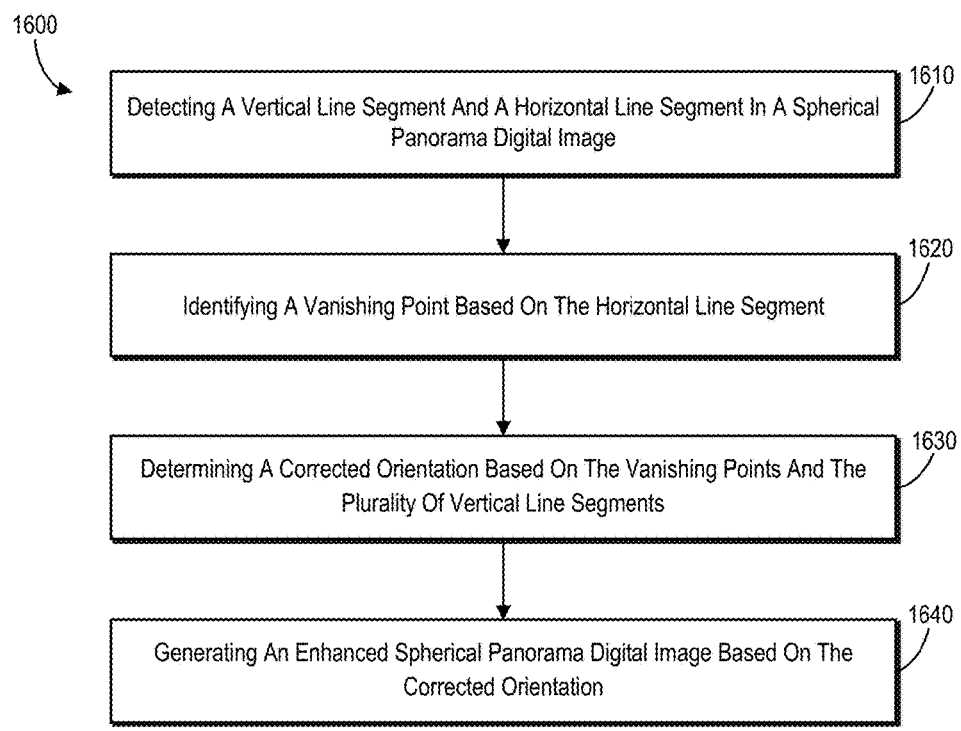
FIG. 16 illustrates a flowchart of a series of acts in a method of correcting skewed spherical panorama digital images in accordance with one or more embodiments.
Figure 17:
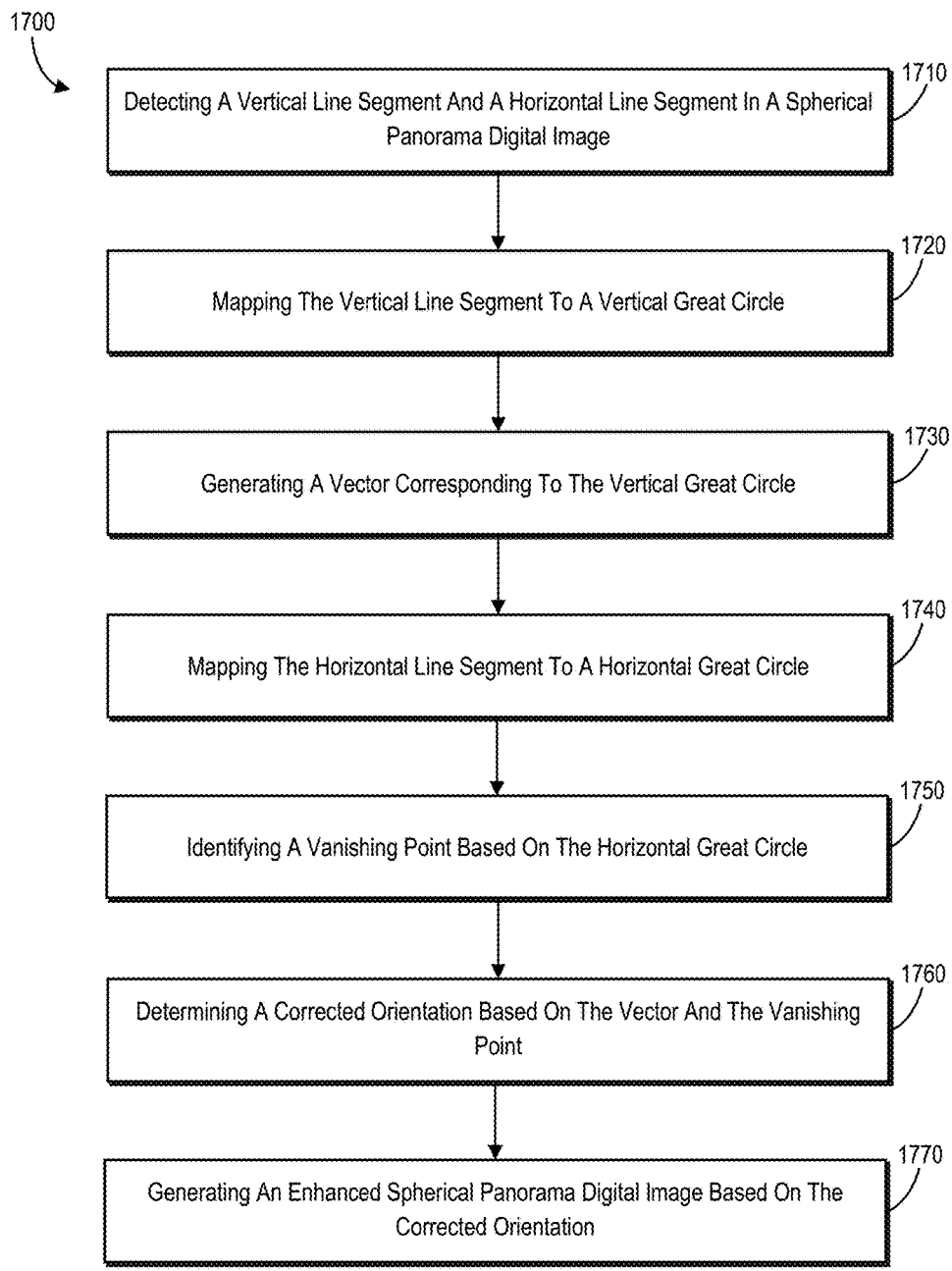
FIG. 17 illustrates a flowchart of a series of acts in a method of correcting skewed spherical panorama digital images in accordance with one or more embodiments.

FIGS. 1-14, the corresponding text, and the examples, provide a number of different systems and devices for correcting orientation in spherical panorama digital images. In addition to the foregoing, embodiments can also be described in terms of flowcharts comprising acts and steps in a method for accomplishing a particular result. For example, FIGS. 15-17 illustrate flowcharts of exemplary methods in accordance with one or more embodiments. The methods described in relation to FIGS. 15-17 may be performed with less or more steps/acts or the steps/acts may be performed in differing orders. Additionally, the steps/acts described herein may be repeated or performed in parallel with one another or in parallel with different instances of the same or similar steps/acts.

FIG. 15 illustrates a flowchart of a series of acts in a method 1500 of correcting orientation in spherical panorama digital images in accordance with one or more embodiments. In one or more embodiments, the method 1500 is performed in a digital medium environment that includes the digital automatic orientation adjustment system 1300. The method 1500 is intended to be illustrative of one or more methods in accordance with the present disclosure, and is not intended to limit potential embodiments. Alternative embodiments can include additional, fewer, or different steps than those articulated in FIG. 15.

As illustrated in FIG. 15, the method 1500 includes an act 1510 of detecting a vertical line segment in a spherical panorama digital image. In particular, the act 1510 can include detecting a plurality of vertical line segments portrayed in a spherical panorama digital image having a plurality of pixels captured by a digital camera, wherein the spherical panorama digital image has an original orientation. For example, in one or more embodiments, the act 1510 comprises detecting a first point and a second point of each line segment in a plurality of line segments of the spherical panorama digital image utilizing a line segment detection algorithm; determining a vertical angle of each line segment in the plurality of line segments based on the first point and the second point; and filtering the plurality of line segments to identify the plurality of vertical line segments by applying a minimum vertical angle threshold. Further, the act 1510 can also include selecting the vertical great circles by applying a spherical Hough transform to the detected vertical line segments portrayed in the spherical panorama digital image.

In addition, as illustrated in FIG. 15, the method 1500 also includes an act 1520 of mapping the vertical line segment to a vertical great circle. In particular, the act 1520 can include mapping vertical line segments of the plurality of vertical line segments to corresponding vertical great circles of a sphere centered on a position of the digital camera. For example, in one or more embodiments, the act 1520 comprises sampling a first point and a second point from a vertical line segment of the plurality of vertical line segments; and projecting the first point and the second point onto the sphere. In addition, the act 1520 can also include identifying a first vector from a center of the sphere to the first point on the sphere; identifying a second vector from the center of the sphere to the second point on the sphere; and determining a vector corresponding to the vertical line segment by determining the cross product of the first vector and the second vector.

As shown in FIG. 15, the method 1500 also includes an act 1530 of determining a corrected orientation based on the vertical great circle. In particular, the act 1530 can include determining a corrected orientation of the spherical panorama digital image based on the vertical great circles. For example, in one or more embodiments, the act 1530 comprises identifying a cost in relation to variation between the vectors corresponding to the vertical great circles and the corrected orientation; identifying a cost in relation to variation between the original vertical direction and the corrected orientation; and determining the corrected orientation utilizing a cost function by minimizing the identified costs.

Moreover, as shown in FIG. 15, the method 1500 also includes an act 1540 of generating an enhanced spherical panorama digital image based on the corrected orientation. In particular, the act 1540 can include generating an enhanced spherical panorama digital image by modifying the plurality of pixels of the spherical panorama digital image based on the original orientation and the corrected orientation. For example, in one or more embodiments, the act 1540 comprises projecting a pixel of the plurality of pixels from the spherical panorama digital image onto a first position on the sphere; determining a rotational matrix based on the original orientation and the corrected orientation; rotating the pixel from the first position to a second position based on the rotational matrix; and utilizing the second position for the pixel to generate the enhanced spherical panorama digital image.

Moreover, in one or more embodiments, the method 1500 also includes detecting horizontal line segments portrayed in the spherical panorama digital image; and mapping each horizontal line segment to a corresponding horizontal great circle of the sphere. Moreover, in one or more embodiments, the method 1500 determines the corrected orientation by determining a corrected vertical pole based on the vertical great circles and the horizontal great circles. Further, the method 1500 can also comprise providing the enhanced spherical panorama digital image for display via a virtual reality device.

FIG. 16 illustrates a flowchart of a series of acts in a method 1600 of correcting orientation in spherical panorama digital images in accordance with one or more embodiments. The method 1600 includes an act 1610 of detecting a vertical line segment and a horizontal line segment in a spherical panorama digital image. In particular, the act 1610 can include detecting a plurality of vertical line segments and a plurality of horizontal line segments portrayed in a spherical panorama digital image having a plurality of pixels, wherein the spherical panorama digital image has an original orientation. For example, in one or more embodiments, the act 1610 comprises detecting a first point and a second point of each line segment in a plurality of line segments of the spherical panorama digital image utilizing a line segment detection algorithm; determining a horizontal angle of each line segment in the plurality of line segments based on the first point and the second point; and filtering the plurality of line segments to identify the plurality of horizontal line segments by applying a minimum horizontal angle threshold. In addition, in one or more embodiments, the act 1610 also comprises selecting the horizontal great circles and the vertical great circles by applying a spherical Hough transform.

In addition, as illustrated in FIG. 16, the method 1600 also includes the act 1620 of identifying a vanishing point based on the horizontal line segment. In particular, the act 1620 can include identifying a vanishing point based on the plurality of horizontal line segments. For example, in one or more embodiments, the act 1620 comprises mapping the plurality of horizontal line segments to corresponding horizontal great circles. Further, in one or more embodiments, the act 1620 can include identifying the vanishing point based on the horizontal great circles. For example, the act 1620 can comprise identifying intersections of the horizontal great circles.

Moreover, as shown in FIG. 16, the method 1600 also includes an act 1630 of determining a corrected orientation based on the vanishing points and the plurality of vertical line segments. In particular, the act 1630 can include determining a corrected orientation of the spherical panorama digital image based on the vanishing point, the plurality of vertical line segments, and the original orientation. For example, in one or more embodiments, the act 1630 comprises mapping the plurality of vertical line segments to corresponding vertical great circles; generating vectors corresponding to the vertical great circles; and determining a corrected vertical pole of the spherical panorama digital image based on the vanishing point, the generated vectors, and the original orientation.

As shown in FIG. 16, the method 1600 can also include an act 1640 of generating an enhanced spherical panorama digital image based on the corrected orientation. In particular, the act 1640 can include generating an enhanced spherical panorama digital image by modifying the plurality of pixels of the spherical panorama digital imaged based on the corrected orientation. For example, in one or more embodiments, the act 1640 comprises projecting a pixel of the plurality of pixels from a first position on the 360-degree digital image onto first coordinates of the sphere; determining a rotational matrix based on the original orientation and the corrected orientation; rotating the pixel from the first coordinates on the sphere to new coordinates on the sphere based on the rotational matrix; and mapping the pixel from the new coordinates on the sphere to a new position on the spherical panorama digital image FIG. 17 illustrates a flowchart of a series of acts in a method 1700 of correcting orientation in spherical panorama digital images in accordance with one or more embodiments. The method 1700 includes an act 1710 of detecting a vertical line segment and a horizontal line segment in a spherical panorama digital image. In particular, the act 1710 can include detecting a plurality of vertical line segments and a plurality of horizontal line segments portrayed in a spherical panorama digital image captured by a digital camera, the spherical panorama digital image having an original orientation.

In addition, as shown in FIG. 17, the method 1700 also includes an act 1720 of mapping the vertical line segment to a vertical great circle. In particular, the act 1720 can include mapping the plurality of vertical line segments to corresponding vertical great circles of a sphere centered on a position of the digital camera.

As shown in FIG. 17, the method 1700 also includes an act 1730 of generating a vector corresponding to the vertical great circle. In particular, the act 1730 can include generating vectors corresponding to the vertical great circles. For example, in one or more embodiments, the act 1730 comprises determining a first point and a second point on a vertical line segment of the vertical line segments; projecting the first point and the second point onto the sphere; identifying a first vector from a center of the sphere to the first point on the sphere; identifying a second vector from the center of the sphere to the second point on the sphere; and determining a vector corresponding to the vertical line segment by determining the cross product of the first vector and the second vector As illustrated in FIG. 17, the method 1700 also includes an act 1740 of mapping the horizontal line segment to a horizontal great circle. In particular, the act 1740 can include mapping the plurality of horizontal line segments to corresponding horizontal great circles of the sphere. For example, in one or more embodiments, the act 1740 comprises projecting horizontal line segments to the sphere, wherein the sphere is a unit sphere, and projecting the line segments around the unit sphere to generate the horizontal great circles.

Moreover, as illustrated in FIG. 17, the method 1700 also includes an act 1750 of identifying a vanishing point based on the horizontal great circle. In particular, the act 1750 can include identifying vanishing points based on the plurality of horizontal great circles. For example, in one or more embodiments, the act 1750 comprises identifying intersections of the horizontal great circles.

As shown in FIG. 17, the method 1700 also includes an act 1760 of determining a corrected orientation based on the vector and the vanishing point. In particular, the act 1760 can include determining a corrected orientation of the spherical panorama digital image based on the vectors corresponding to the vertical great circles, the vanishing points, and the original orientation. For example, the act 1760 can comprise identifying a cost based on the vertical great circles (e.g., variation between the vertical great circles and the corrected orientation); a cost based on the vanishing points (e.g., variation between the vanishing points and the corrected orientation); and a cost based on the original orientation (e.g., variation between the original orientation and the corrected orientation). Moreover, the act 1760 can include determining the corrected orientation by minimizing the identified costs.

In addition, as shown in FIG. 17, the method 1700 also includes an act 1770 of generating an enhanced spherical panorama digital image based on the corrected orientation. In particular, the act 1770 can include generating an enhanced spherical panorama digital image by modifying the pixels of the spherical panorama digital image based on the original vertical direction and the corrected orientation. For example, in one or more embodiments, the act 1770 comprises projecting a pixel of the plurality of pixels from the panorama digital image onto first coordinates of the sphere; determining a rotational matrix based on the original orientation and the corrected orientation; rotating the pixel from the first coordinates on the sphere to new coordinates on the sphere based on the rotational matrix; and utilizing the new coordinates to generate the enhanced spherical panorama digital image Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 18:
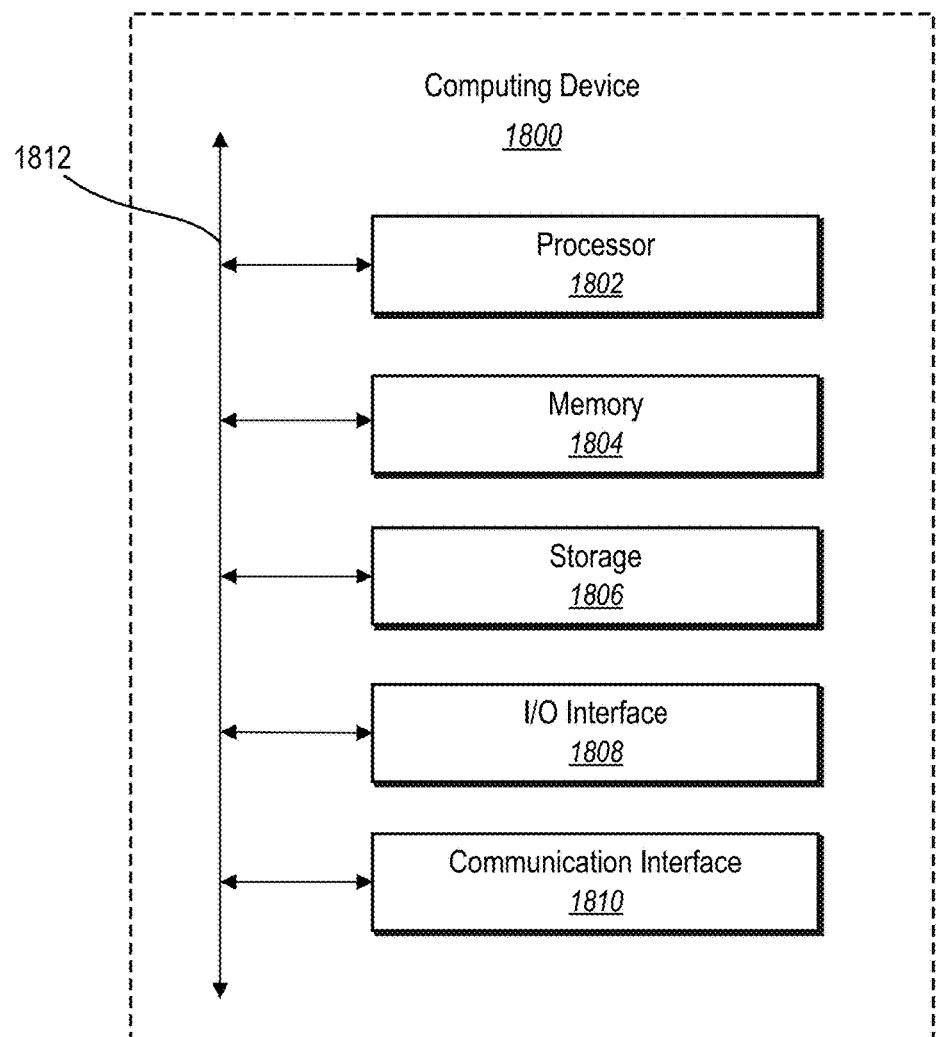
FIG. 18 illustrates a block diagram of an exemplary computing device in accordance with one or more embodiments.

FIG. 18 illustrates, in block diagram form, an exemplary computing device 1800 that may be configured to perform one or more of the processes described above. One will appreciate that the digital automatic orientation adjustment system 1300 can comprise implementations of the computing device 1800. As shown by FIG. 18, the computing device can comprise a processor 1802, memory 1804, a storage device 1806, an I/O interface 1808, and a communication interface 1810. In certain embodiments, the computing device 1800 can include fewer or more components than those shown in FIG. 18. Components of computing device 1800 shown in FIG. 18 will now be described in additional detail.

In particular embodiments, processor(s) 1802 includes hardware for executing instructions, such as those making up a computer program. As an example and not by way of limitation, to execute instructions, processor(s) 1802 may retrieve (or fetch) the instructions from an internal register, an internal cache, memory 1804, or a storage device 1806 and decode and execute them.

The computing device 1800 includes memory 1804, which is coupled to the processor(s) 1802. The memory 1804 may be used for storing data, metadata, and programs for execution by the processor(s). The memory 1804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1804 may be internal or distributed memory.

The computing device 1800 includes a storage device 1806 includes storage for storing data or instructions. As an example and not by way of limitation, storage device 1806 can comprise a non-transitory storage medium described above. The storage device 1806 may include a hard disk drive (HDD), flash memory, a Universal Serial Bus (USB) drive or a combination of these or other storage devices.

The computing device 1800 also includes one or more input or output ("I/O") devices/interfaces 1808, which are provided to allow a user to provide input to (such as user strokes), receive output from, and otherwise transfer data to and from the computing device 1800. These I/O devices/interfaces 1808 may include a mouse, keypad or a keyboard, a touch screen, camera, optical scanner, network interface, modem, other known I/O devices or a combination of such I/O devices/interfaces 1808. The touch screen may be activated with a stylus or a finger.

The I/O devices/interfaces 1808 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1808 is configured to provide graphical data to a display for presentation to a user. The graphical data may be representative of one or more graphical user interfaces and/or any other graphical content as may serve a particular implementation.

The computing device 1800 can further include a communication interface 1810. The communication interface 1810 can include hardware, software, or both. The communication interface 1810 can provide one or more interfaces for communication (such as, for example, packet-based communication) between the computing device and one or more other computing devices 1800 or one or more networks. As an example and not by way of limitation, communication interface 1810 may include a network interface controller (NIC) or network adapter for communicating with an Ethernet or other wire-based network or a wireless NIC (WNIC) or wireless adapter for communicating with a wireless network, such as a WI-FI. The computing device 1800 can further include a bus 1812. The bus 1812 can comprise hardware, software, or both that couples components of computing device 1800 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. In a digital medium environment, a computer-implemented method of correcting skewed spherical panorama digital images to align scene orientation to image axes, comprising:
    detecting a plurality of vertical line segments portrayed in a spherical panorama digital image having a plurality of pixels captured by a digital camera, wherein the spherical panorama digital image has an original orientation;
    mapping vertical line segments of the plurality of vertical line segments to corresponding vertical three-dimensional projections on a sphere centered on a position of the digital camera;
    determining a corrected orientation of the spherical panorama digital image based on the vertical three-dimensional projections; and
    generating an enhanced spherical panorama digital image by modifying the plurality of pixels of the spherical panorama digital image based on the original orientation and the corrected orientation.

2. The method of claim 1, wherein detecting the plurality of vertical line segments portrayed in the spherical panorama digital image comprises:
    detecting a first point and a second point of each line segment in a plurality of line segments of the spherical panorama digital image utilizing a line segment detection algorithm;
    determining a vertical angle of each line segment in the plurality of line segments based on the first point and the second point; and
    filtering the plurality of line segments to identify the plurality of vertical line segments by applying a minimum vertical angle threshold.

3. The method of claim 1, wherein mapping vertical line segments to the corresponding vertical three-dimensional projections comprises:
    sampling a first point and a second point from a vertical line segment of the plurality of vertical line segments; and
    projecting the first point and the second point onto the sphere.

4. The method of claim 3, further comprising identifying vectors corresponding to the vertical three-dimensional projections by:
    identifying a first vector from a center of the sphere to the first point on the sphere;
    identifying a second vector from the center of the sphere to the second point on the sphere; and
    determining a vector corresponding to the vertical line segment by generating the cross product of the first vector and the second vector.

5. The method of claim 4, wherein determining the corrected orientation comprises:
    identifying a first cost in relation to variation between the vectors corresponding to the vertical three-dimensional projections and the corrected orientation;
    identifying a second cost in relation to variation between an original vertical direction of an original orientation and the corrected orientation; and
    determining the corrected orientation utilizing a cost function by minimizing the first cost and the second cost.

6. The method of claim 1, further comprising, selecting the vertical three-dimensional projections by applying a spherical Hough transform to the detected plurality of vertical line segments portrayed in the spherical panorama digital image.

7. The method of claim 1, further comprising:
detecting horizontal line segments portrayed in the spherical panorama digital image; and
mapping each horizontal line segment to a corresponding horizontal three-dimensional projection on the sphere; and
wherein determining the corrected orientation comprises determining a corrected vertical pole based on the vertical three-dimensional projections and the horizontal three-dimensional projections.

8. The method of claim 1, wherein modifying the pixels of the spherical panorama digital image based on the original orientation and the corrected orientation to generate the enhanced spherical panorama digital image comprises:
projecting a pixel of the plurality of pixels from the spherical panorama digital image onto a first position on the sphere;
determining a rotational matrix based on the original orientation and the corrected orientation;
rotating the pixel from the first position to a second position based on the rotational matrix; and
utilizing the second position for the pixel to generate the enhanced spherical panorama digital image.

9. The method of claim 1, further comprising, providing the enhanced spherical panorama digital image for display via a virtual reality device.

10. A system comprising:
at least one processor; and
at least one non-transitory computer readable storage medium storing instructions that, when executed by the at least one processor, cause the system to:
detect a plurality of vertical line segments portrayed in a spherical panorama digital image having a plurality of pixels captured by a digital camera, wherein the spherical panorama digital image has an original orientation;
map vertical line segments of the plurality of vertical line segments to corresponding vertical three-dimensional projections on a sphere centered on a position of the digital camera;
determine a corrected orientation of the spherical panorama digital image based on the vertical three-dimensional projections; and
generate an enhanced spherical panorama digital image by modifying the plurality of pixels of the spherical panorama digital image based on the original orientation and the corrected orientation.

11. The system of claim 10, further comprising instructions that, when executed by the at least one processor, cause the system to detect the plurality of vertical line segments portrayed in the spherical panorama digital image by:
detecting a first point and a second point of each line segment in a plurality of line segments of the spherical panorama digital image utilizing a line segment detection algorithm;
determining a vertical angle of each line segment in the plurality of line segments based on the first point and the second point; and
filtering the plurality of line segments to identify the plurality of vertical line segments by applying a minimum vertical angle threshold.

12. The system of claim 10, further comprising instructions that, when executed by the at least one processor, cause the system to map the vertical line segments to the corresponding vertical three-dimensional projections by:
sampling a first point and a second point from a vertical line segment of the plurality of vertical line segments; and
projecting the first point and the second point onto the sphere.

13. The system of claim 12, further comprising instructions that, when executed by the at least one processor, cause the system to identify vectors corresponding to the vertical three-dimensional projections by:
identifying a first vector from a center of the sphere to the first point on the sphere;
identifying a second vector from the center of the sphere to the second point on the sphere; and
determining a vector corresponding to the vertical line segment by generating the cross product of the first vector and the second vector.

14. The system of claim 13, further comprising instructions that, when executed by the at least one processor, cause the system to determine the corrected orientation by:
identifying a first cost in relation to variation between the vectors corresponding to the vertical three-dimensional projections and the corrected orientation;
identifying a second cost in relation to variation between an original vertical direction of the original orientation and the corrected orientation; and
determining the corrected orientation utilizing a cost function by minimizing the first cost and the second cost.

15. The system of claim 10, further comprising instructions that, when executed by the at least one processor, cause the system to:
detect horizontal line segments portrayed in the spherical panorama digital image;
map each horizontal line segment to a corresponding horizontal three-dimensional projection on the sphere; and
determine the corrected orientation by determining a corrected vertical pole based on the vertical three-dimensional projections and the horizontal three-dimensional projections.

16. The system of claim 10, further comprising instructions that, when executed by the at least one processor, cause the system to modify the pixels of the spherical panorama digital image based on the original orientation and the corrected orientation to generate the enhanced spherical panorama digital image by:
projecting a pixel of the plurality of pixels from the spherical panorama digital image onto a first position on the sphere;
determining a rotational matrix based on the original orientation and the corrected orientation;
rotating the pixel from the first position to a second position based on the rotational matrix; and
utilizing the second position for the pixel to generate the enhanced spherical panorama digital image.

17. A non-transitory computer readable medium storing instructions thereon that, when executed by at least one processor, cause a computer system to:
detect a plurality of vertical line segments portrayed in a spherical panorama digital image having a plurality of pixels captured by a digital camera, wherein the spherical panorama digital image has an original orientation;
map vertical line segments of the plurality of vertical line segments to corresponding vertical three-dimensional projections on a sphere centered on a position of the digital camera;

determine a corrected orientation of the spherical panorama digital image based on the vertical three-dimensional projections; and generate an enhanced spherical panorama digital image by modifying the plurality of pixels of the spherical panorama digital image based on the original orientation and the corrected orientation.

18. The non-transitory computer readable medium of claim 17, further comprising instructions that, when executed by the at least one processor, cause the computer system to detect the plurality of vertical line segments portrayed in the spherical panorama digital image by:

detecting a first point and a second point of each line segment in a plurality of line segments of the spherical panorama digital image utilizing a line segment detection algorithm;

determining a vertical angle of each line segment in the plurality of line segments based on the first point and the second point; and filtering the plurality of line segments to identify the plurality of vertical line segments by applying a minimum vertical angle threshold.

19. The non-transitory computer readable medium of claim 17, further comprising instructions that, when executed by the at least one processor, cause the computer system to:

detect horizontal line segments portrayed in the spherical panorama digital image;

map each horizontal line segment to a corresponding horizontal three-dimensional projection on the sphere; and determine the corrected orientation by determining a corrected vertical pole based on the vertical three-dimensional projections and the horizontal three-dimensional projections.

20. The non-transitory computer readable medium of claim 17, further comprising instructions that, when executed by the at least one processor, cause the computer system to provide the enhanced spherical panorama digital image for display via a virtual reality device, mapping vertical line segments of the plurality of vertical line segments to corresponding vertical three-dimensional projections on a sphere centered on a position of the digital camera; determining a corrected orientation of the spherical panorama digital image based on the vertical three-dimensional projections; and generating an enhanced spherical panorama digital image by modifying the plurality of pixels of the spherical panorama digital image based on the original orientation and the corrected orientation.

* * * * *